(12) United States Patent
Brown

(10) Patent No.: US 10,760,734 B1
(45) Date of Patent: Sep. 1, 2020

(54) CONTAINER STORAGE APPARATUS AND SYSTEM

(71) Applicant: Daniel Everett Brown, Chowchilla, CA (US)

(72) Inventor: Daniel Everett Brown, Chowchilla, CA (US)

( * ) Notice: Subject to any disclaimer, the term of this patent is extended or adjusted under 35 U.S.C. 154(b) by 0 days.

(21) Appl. No.: 16/400,027

(22) Filed: Apr. 30, 2019

(51) Int. Cl.
| | |
|---|---|
| F16M 13/02 | (2006.01) |
| F16B 2/12 | (2006.01) |
| A47B 96/06 | (2006.01) |
| A47B 96/07 | (2006.01) |
| A47F 5/08 | (2006.01) |

(52) U.S. Cl.
CPC ......... *F16M 13/027* (2013.01); *A47B 96/061* (2013.01); *A47B 96/066* (2013.01); *A47B 96/07* (2013.01); *A47F 5/08* (2013.01); *F16B 2/12* (2013.01)

(58) Field of Classification Search
CPC .. F16M 13/027; F16M 11/041; A47B 96/066; A47B 96/07; A47B 96/067; A47B 96/061; A47B 43/003; A47B 47/0081; A47B 87/007; A47B 88/04; A47B 88/18; A47B 88/0407; B65D 5/50; B65D 5/5206; B65D 88/027; B65D 88/005; A47F 5/08; A47F 5/0838; A47F 5/0876; A47F 5/0861; A47F 1/128; A47F 5/0869; A47F 5/0823; A47F 5/0006; A47F 7/143; A47F 1/126; A47F 5/0892; B25H 3/00; E05B 69/006; F16B 2/12
USPC ... 211/85.29, 117, 4, 7, 57.1, 59.3, 59.1, 51, 211/54.1, 1.3, 85.17, 85.19, 85.21, 85.23; 221/279, 271, 267, 241, 242, 282, 312 A; 248/317, 342, 343
See application file for complete search history.

(56) References Cited

U.S. PATENT DOCUMENTS

| | | | | |
|---|---|---|---|---|
| 2,823,056 | A | * | 2/1958 | Di Meo ................... H04Q 1/06 403/376 |
| 2,865,697 | A | * | 12/1958 | Staley .................... A47D 1/008 108/25 |
| 3,331,645 | A | * | 7/1967 | Vercellotti ........... A47B 49/002 312/248 |
| 3,433,446 | A | * | 3/1969 | Meder ....................... A47F 7/00 248/316.3 |
| 3,528,718 | A | * | 9/1970 | Braun ................... B65F 1/1436 312/308 |
| 4,289,292 | A | * | 9/1981 | Kunjumon ........... F16M 11/046 211/117 |

(Continued)

*Primary Examiner* — Jennifer E. Novosad
(74) *Attorney, Agent, or Firm* — Richard A. Ryan

(57) ABSTRACT

An apparatus and system for removably storing an object in an area having one or more area supports so as to position the container below the area supports and above the floor of the area. The apparatus has a support rail that mounts to the area supports and a container engaging section that securely holds the object. The container engaging section has a static support assembly and a dynamic support assembly defining a space for the object. The static support assembly engages one side of the object. The dynamic support assembly has a dynamic support that connects to a moving mechanism so it will move along the support rail to engage an opposing side of the object. A biasing mechanism biases the dynamic support toward the static support assembly to secure the object therebetween. The support rail has a track and the moving mechanism moves along the track.

20 Claims, 23 Drawing Sheets

(56) References Cited

U.S. PATENT DOCUMENTS

| | | | | |
|---|---|---|---|---|
| 4,413,801 A * | 11/1983 | Lancaster | ............... | E06C 5/24 224/405 |
| 4,527,694 A * | 7/1985 | Bolt | ............... | H05F 3/02 211/162 |
| 4,576,319 A * | 3/1986 | Brown | ............... | B60R 11/00 224/538 |
| 4,699,437 A * | 10/1987 | Genereaux | ............... | A47B 46/005 220/480 |
| 4,699,438 A * | 10/1987 | Kikuta | ............... | H01R 13/6275 439/353 |
| 4,738,369 A * | 4/1988 | Desjardins | ............... | F16M 11/28 211/113 |
| 5,039,902 A * | 8/1991 | Schwarz | ............... | A47B 49/00 206/806 |
| 5,242,219 A * | 9/1993 | Tomaka | ............... | A47B 46/005 220/485 |
| 5,277,463 A * | 1/1994 | Singh | ............... | E21B 19/06 294/103.1 |
| 5,316,244 A * | 5/1994 | Zetena, Jr. | ............... | G02B 6/4459 174/95 |
| 5,441,322 A * | 8/1995 | Jobmann | ............... | B66C 1/422 294/103.1 |
| 5,484,125 A * | 1/1996 | Anoszko | ............... | F24F 13/32 248/201 |
| 5,520,291 A * | 5/1996 | Graham | ............... | A47B 81/005 211/4 |
| 5,649,751 A * | 7/1997 | Longhurst | ............... | A47B 46/005 248/201 |
| 5,725,293 A * | 3/1998 | Wilkening | ............... | A47B 49/004 211/116 |
| 5,749,479 A * | 5/1998 | Belokin | ............... | A47F 5/0892 211/113 |
| 5,964,359 A * | 10/1999 | Marino, Jr. | ............... | A47F 7/283 211/74 |
| 6,056,378 A * | 5/2000 | Semon | ............... | A47B 88/407 312/246 |
| 6,250,655 B1 * | 6/2001 | Sheeks | ............... | B62B 1/268 280/47.18 |
| 7,597,203 B2 * | 10/2009 | Jasniy | ............... | A47F 5/0892 211/117 |
| 7,681,853 B2 * | 3/2010 | Trusty | ............... | E06C 1/005 182/127 |
| 7,762,636 B2 * | 7/2010 | Veeser | ............... | A47B 88/407 219/385 |
| 7,895,955 B2 * | 3/2011 | Ferder | ............... | A47B 43/003 108/149 |
| 8,622,493 B2 * | 1/2014 | Roeck | ............... | A47B 77/18 312/330.1 |
| 8,782,962 B1 * | 7/2014 | Schoewe | ............... | A47B 88/402 52/27 |
| 8,800,785 B2 * | 8/2014 | Kalafut | ............... | A47F 5/0861 211/103 |
| 8,851,306 B2 * | 10/2014 | Spurr | ............... | A47B 46/005 211/117 |
| 9,138,077 B2 * | 9/2015 | Found | ............... | A47F 5/08 |
| 9,290,293 B2 * | 3/2016 | Tilton | ............... | B65D 5/50 |
| 9,714,738 B1 * | 7/2017 | Brown | ............... | B65G 1/02 |
| 9,737,144 B1 * | 8/2017 | Brown | ............... | A47F 5/08 |
| 10,238,212 B1 * | 3/2019 | Brown | ............... | A47F 1/06 |
| 10,271,651 B1 * | 4/2019 | Brown | ............... | A47B 96/067 |
| 2004/0020915 A1 * | 2/2004 | Shei | ............... | F24C 7/06 219/385 |
| 2006/0201899 A1 * | 9/2006 | Lin | ............... | A47B 88/40 211/183 |
| 2008/0011928 A1 * | 1/2008 | Adrian | ............... | H02G 3/20 248/343 |
| 2008/0036341 A1 * | 2/2008 | Nilsen | ............... | A47F 5/0892 312/246 |
| 2015/0167356 A1 * | 6/2015 | Leyden | ............... | E05B 73/0017 223/85 |

\* cited by examiner

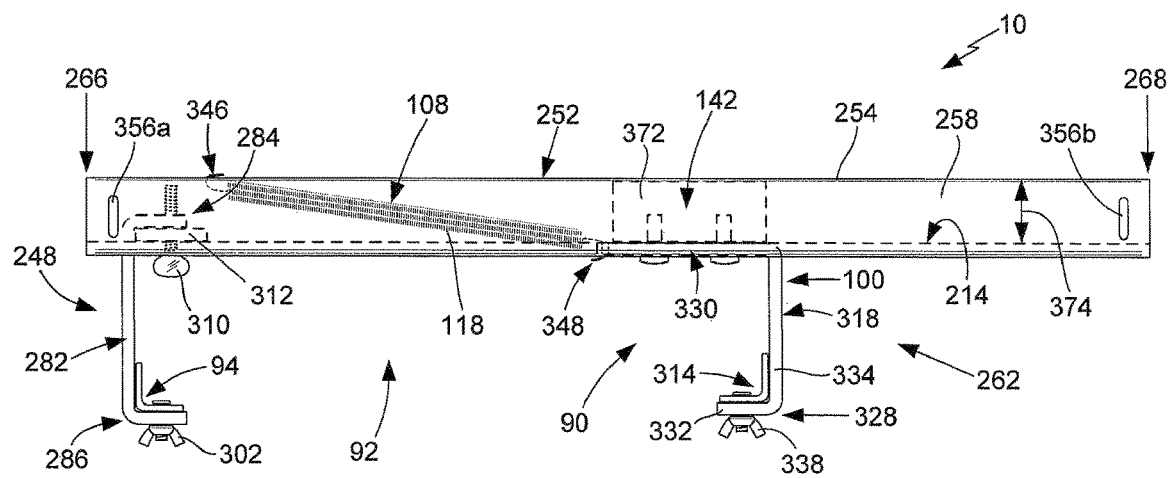
FIG. 25
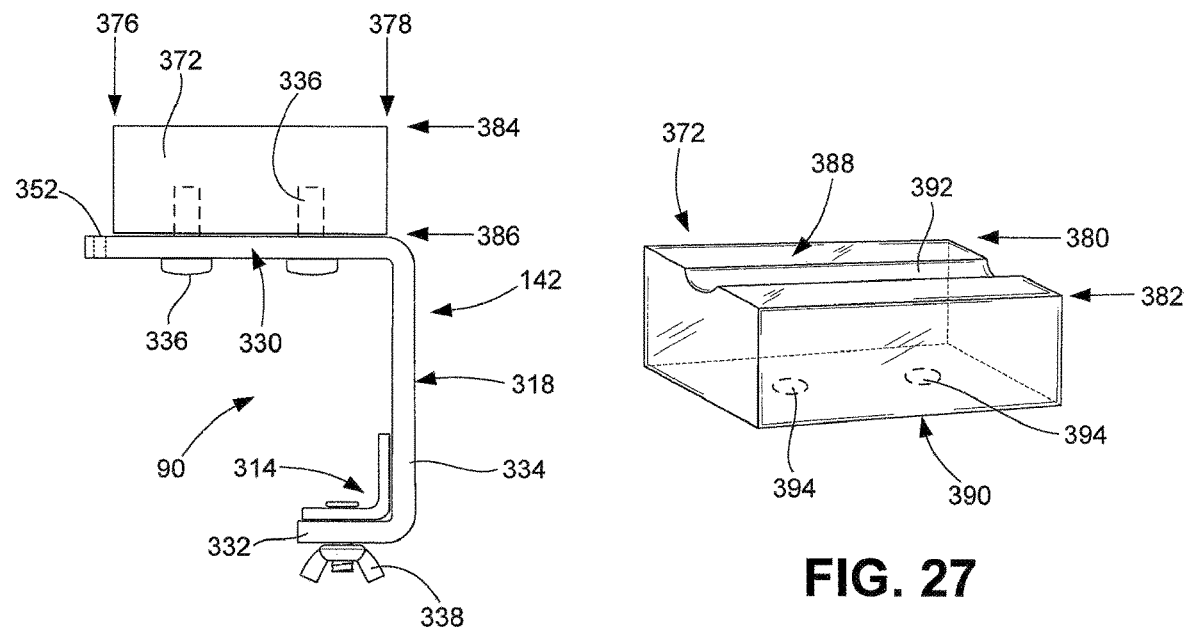
FIG. 26
FIG. 27

CONTAINER STORAGE APPARATUS AND SYSTEM

CROSS-REFERENCE TO RELATED APPLICATIONS

This patent application is a continuation-in-part of U.S. patent application Ser. No. 15/657,073 filed Jul. 21, 2017, which issued as U.S. Pat. No. 10,271,651 on Apr. 30, 2019, which is a continuation-in-part of U.S. patent application Ser. No. 15/655,579 filed Jul. 20, 2017, which issued as U.S. Pat. No. 10,238,212 on Mar. 26, 2019, which is a continuation-in-part of U.S. patent application Ser. No. 15/134,354 filed Apr. 20, 2016, which issued as U.S. Pat. No. 9,714,738 on Jul. 25, 2017, which is a continuation-in-part of U.S. patent application Ser. No. 15/060,166 filed Mar. 3, 2016, which issued as U.S. Pat. No. 9,737,144 on Aug. 22, 2017.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to apparatuses and systems that are utilized to store containers. In particular, the present invention relates to such storage apparatuses and systems that are configured to removably store one or more containers in a manner which allows a person to easily place containers in the apparatus or remove one of the containers from the apparatus. Even more particularly, the present invention relates to such container storage apparatuses and systems that are configured to store different sizes of containers at the same time.

B. Background

Many people utilize storage containers to store items, particularly a plurality of items that would otherwise be loose in a closet, garage, room or other area. Typically, but not always, the items which are stored in a storage container are items that the person does not need to have access to on a daily or even regular basis. For instance, items commonly stored in a storage container may include Christmas or other holiday decorations, camping gear, tools, hobby or craft materials, family memory items, old or seasonal clothes, school papers and the like. These storage containers, and the items stored therein, are often stacked or otherwise placed in a garage or storage shed in a manner where they are intended to be at least generally out of the person's way of using the garage or storage shed for storing other, typically larger, items such as vehicles, lawnmowers, bicycles and the like. Unfortunately, as generally well known by persons who have and utilize storage containers, the containers are often in the way of what he or she needs to accomplish or to access in the location.

The typical storage container has a container body with one or more sidewalls and bottom wall and a lid that is secured to the container to define an interior chamber where the items are stored. A typical storage container has a plurality of sidewalls that are configured in a square or, perhaps more commonly, a rectangular shape. The lid may be of the type that is removably attached to the container body or of the type that is pivotally attached to one or more of the sidewalls. Storage containers may be made of a wide variety of materials, with hard plastic perhaps being the most commonly utilized material. One type of storage container is commonly referred to as a "storage tote" or simply a "tote". Storage totes are typically made out of hard plastic and are rectangularly shaped. Some storage totes have a removable lid that snaps onto the top of the sidewalls. Others have a pair of hinged lid members that pivot closed to form the lid or open to allow access to the interior chamber. One feature of storage totes is that they are generally structured and arranged with sloping sidewalls that result in a smaller cross-section near the bottom wall than the top of the sidewalls so they may be easily stacked on top of each other. Another feature of storage totes is that they have an overhanging lip on the top of at least two of the opposing sidewalls, often the long sidewalls.

As set forth above with storage containers in general, storage totes can be relatively easily stacked on the floor of a garage or a shed. However, many people prefer to place the storage totes above the floor so the floor can be utilized to park a car, stand a bicycle, have a workshop and the like and to be able to more easily move around inside the garage or shed. One manner of supporting the storage totes or other containers above the floor is to place the storage containers on one or more shelves which are either freestanding or securely attached to the walls of the garage or shed. As well known, the freestanding shelves also take up some of the same floor space, although generally less than the storage containers themselves, that would be lost to stacking the containers on the floor. Shelves that are attached to the wall are generally either not adequate for supporting the weight of the containers and the items stored therein or they require a relatively complex and well-built shelving system to support the containers. Another common storage system for storage totes and other storage containers is to place the storage totes on a "drop-down" platform that is, typically, supported from the ceiling or roof of the garage or shed. As with the wall-attached shelves, any platform that will be supporting a plurality of storage containers must be sufficiently well-built to be able to safely support the anticipated load from the containers and the items stored in the containers. Another limitation with platform storage systems, particularly those where one or more layers of containers may be placed more than one row deep, is that when a person wants or needs certain items in a container he or she may have to move multiple containers in order to get to the desired container. This difficultly can be somewhat compounded by the fact that most platform systems require the user to stand on a ladder or other apparatus when placing, moving or removing containers from the platform.

A more recent innovation with regard to storing storage containers, particularly storage totes, is the use of an "I-beam" storage system comprising a pair of spaced apart I-shaped support members (though L-shaped and Z-shaped) members can also be utilized). The I-shaped support members have an upper flange that is attached to the ceiling, roof or roof joists and a lower flange that is utilized to removably support the storage containers. The two support members are supported from above in a manner such that the inwardly facing lower flanges thereof are spaced apart a distance selected so a lip on each of the opposing sides of the tote container will be supported by one of the inwardly facing lower flanges of the I-beams. In effect, the facing lower flanges of the two I-beams function as rails on which the opposite facing lips of one or more storage totes are slid onto and supported. As will be readily appreciated by persons who are familiar with I-beam systems, the use of the system requires careful positioning of the two I-beam support members so that the inwardly facing lower flanges are properly spaced apart from each other to receive the outward extending lips of the storage totes, which typically only extend approximately an inch or so from the sidewalls. If the two support members are too close, the totes will not fit between the lower flanges of the support members. If the two support members are too far apart, the lower flanges will not be able to support the totes. As such, a person installing an I-beam system, or like support members, must carefully measure the distance between the two lips of the storage totes and carefully position the support members on the ceiling, roof or roof beams.

While the above support member systems have significant benefits with regard to positioning the storage totes and like containers off of the floor and generally out of the way, they do have limitations that have prevented their wide use. One major limitation of these systems, no matter whether the support members are I-shaped, L-shaped or Z-shaped, is that once the pair of support members are in place, the system can only be utilized for the particular width of storage tote for which the spacing was measured. This either requires the person to have totes with all of the same width, which is not typical due to different manufactures having different sizes, or to purchase a new set of totes that are all of the same size. Another limitation to such systems is that once a plurality of totes are placed on the inwardly facing lower flanges of the support members, the user will usually have to remove one or more of the totes to get to the tote in which the items he or she wants are stored. This requires the person to slide off each of the "wrong" totes to get to the "correct" tote and then place all of the removed totes back onto the support members. Depending on the number of totes being supported by the support member system, this could take considerable effort if the desired tote is positioned in a location where there are many other totes that must first be removed. Another limitation for such systems is that the I-beams must be positioned where there is sufficient space at one end of the system to place the containers on the I-beams. If the both ends of the I-beam system are too close to a wall or other structure, the system will not work because a person will not be able to place containers on the I-beams.

What is needed, therefore, is an improved apparatus and system for receiving and storing storage containers that overcomes the limitations and solves the issues with regard to presently available container storage apparatuses and systems. More specifically, what is needed is an improved storage apparatus and system that is structured and arranged to support a plurality of storage totes or like containers that allow different sized containers to be placed in the same apparatus, allow a person to more easily remove one particular container from a plurality of containers stored in the apparatus and allows the system to be placed close to a wall or other structure. The improved storage apparatus and system should be configured to removably support a plurality of tote or like containers that each have outwardly disposed lips on at least opposite facing sidewalls of the container. The apparatus should be structured and arranged to support the tote containers by the lips thereof. The improved apparatus and system should be structured and arranged to be supported by the ceiling, roof or roof joists such that the storage totes or like containers are positioned off of the floor of the garage, shed or other area, including closets or other rooms inside of a house or other structure. Preferably, the new storage apparatus and system should be relatively easy to install, easy to use and inexpensive to manufacture.

SUMMARY OF THE INVENTION

The following presents a simplified summary of the disclosure of the present invention in order to provide a basic understanding of the invention to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later.

The use of terms such as "including", "comprising" or "having" and variations thereof herein is meant to encompass the items listed thereafter and equivalents thereof. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The container storage apparatus and system of the present invention provides the benefits and solves the problems identified above. That is to say, the container storage apparatus and system of the present invention is structured and arranged to support a plurality of storage totes or like containers that have outward extending lips on opposite sidewalls of the container by the engaging the opposite side lips of each container. The new apparatus and system is configured to allow use of different widths and lengths of tote containers to be placed in the apparatus and is configured so a person may easily remove one particular container from a plurality of containers that are stored in the apparatus. The new apparatus and system can be placed close to walls and other structures in the area without interfering with use of the structure and system. The apparatus comprises an upper mounting section and a lower container engaging section. The mounting section is structured and arranged to be easily mounted to the ceiling, roof or joists of a storage area, including garages, sheds, rooms, closets and like areas and to support the lower container engaging section and the storage containers, and the items stored therein, that are engaged by the lower section above the floor of the area where the totes are stored. The container engaging section is structured and arranged to adjustably support different widths and lengths of totes. As such, it will not be necessary for the user of the apparatus and system to purchase storage totes of the same size, particularly if that would require replacing the user's existing storage containers. The lower container engaging section is also structured and arranged to allow the user to easily remove one of the storage totes from a plurality of storage totes, even if the desired storage tote is in the center or at a closed end (i.e., near a wall or door) of the apparatus. In the preferred configurations, the new container storage apparatus and system are relatively easy to install, easy to use and inexpensive to manufacture.

The apparatus of the present invention comprises a mounting section and a container engaging section. The mounting section comprises an elongated support rail that is structured and arranged to be securely attached to one or more area supports. In a preferred configuration, the support rail has a plurality of walls that define an interior channel in the support rail. The plurality of walls of the support rail includes an upper wall defining an upper mounting surface configured to be attached to at least one of the one or more area supports so as to position the support rail of the apparatus below the area supports. The container engaging section, which is attached to or integral with the mounting section, is structured and arranged to engage the container body so as to position the storage container in a container space of the container engaging section. The container engaging section has a static container support assembly and a dynamic container support assembly. The static container support assembly comprises an elongated static support member that is attached to or integral with the support rail. The static support member has a lip engaging member which is sized and configured to engage either the first lip or second lip of the storage container when the storage container is positioned in the container space. The dynamic container storage assembly comprises a dynamic support that is moveably engaged with the support rail. The dynamic support is in spaced apart relation to the lip engaging member of the static container support assembly to define the container space therebetween. The dynamic support has a biasing mechanism, a moving mechanism and an elongated dynamic support member. The biasing mechanism interconnects the dynamic support member and a stationary component, typically either the support rail or the static container support assembly in order to bias the dynamic support toward the static container support assembly. The moving mechanism, which is connected to the dynamic support member, is configured to moveably engage the support rail so as to move the dynamic support along the support rail when it is biased by the biasing mechanism toward the static container support assembly. Each of the static container support assembly and the dynamic container support assembly are structured and arranged to removably support the storage container in the container space below the support rail. In the preferred embodiments, the static support member and dynamic support member are disposed perpendicular to the support rail.

In a preferred configuration, the dynamic support member has a lip engaging member that is sized and configured to engagedly support one of the lips of the container body to securely hold the storage container between the lip engaging member of the static container storage assembly and the lip engaging member of the dynamic support member. The preferred configuration of the fourth embodiment also has a track that is disposed inside the interior channel of the support rail, with the moving mechanism having one or more track engaging devices that are structured and arranged to moveably engage the track to move in the interior channel of the support rail.

In one embodiment of the system of the present invention, the new container storage system comprises the above-described apparatus, one or more area supports and a storage container having a container body with a first lip extending outward from a first sidewall and a second lip extending outward from a second sidewall disposed in opposing relation to said first sidewall. In use, the apparatus is secured to at least one of the area supports and a storage container is removably held by the apparatus with the bottom wall of the storage container in spaced apart relation to a lower surface in the area.

Accordingly, the primary object of the present invention is to provide a new container storage apparatus and system that has the advantages discussed above and elsewhere in the present disclosure and which overcomes the various disadvantages and limitations associated with presently available apparatuses and systems for storing totes and other storage containers.

It is an important objective of the present invention to provide a new storage container apparatus and system that is structured and arranged to support a tote or like storage container on one or more area supports, such as joists of a ceiling, with the apparatus being configured to removably support different sizes of storage containers and which allows a person to easily store and remove storage containers from the apparatus.

An important aspect of the present invention is that it provides a new container storage apparatus and system that achieves the goals of the above-described objectives.

Another important aspect of the present invention is that it provides a new container storage apparatus and system that is structured and arranged to support a storage tote or like container having outward extending lips on opposite sidewalls of the container by engaging the opposite side lips of each container to support the containers above a floor or other surface.

Another important aspect of the present invention is that it provides a new container storage apparatus that is structured and arranged to allow use of storage containers that may have different widths and/or lengths and to allow a person to easily store and then remove storage containers from the apparatus.

Another important aspect of the present invention is that it provides a new container storage apparatus that has an upper mounting section and a lower container engaging section, with the upper mounting section being structured and arranged to be mounted to the ceiling, roof or joists of a storage area and to safely support the lower container engaging section and storage containers above the floor and the lower container engaging section being structured and arranged to adjustably support different widths and lengths of storage containers in a manner which allows an individual storage container to be easily removed therefrom.

Yet another important aspect of the present invention is that it provides a new container storage apparatus and system that is relatively easy to install, easy to use and inexpensive to manufacture.

As will be explained in greater detail by reference to the attached figures and the description of the preferred embodiments which follows, the above and other objects and aspects are accomplished or provided by the present invention. As set forth herein and will be readily appreciated by those skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. As will be readily understood and appreciated, the scope of the invention is only limited by the claims which follow after the discussion.

BRIEF DESCRIPTION OF THE DRAWINGS

In the drawings which illustrate the preferred embodiments and the best modes presently contemplated for carrying out the present invention:

FIG. 25 is a right side view of a third embodiment of the container storage apparatus of the present invention, with the dynamic container support assembly biased by said biasing mechanism toward said static container support assembly placing the apparatus in its first or biased position;

FIG. 26 is a side view of the moving mechanism of the embodiment of the container storage apparatus of FIG. 25 attached to the dynamic support bracket of the dynamic container support assembly;

FIG. 27 is a side perspective view of the moving mechanism of the container storage apparatus of FIG. 26 shown separate from the dynamic support bracket;

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the apparatus and system of the present invention and the storage containers utilized therewith, those persons who are skilled in the art will readily appreciate that the present invention is not so limited. In addition, the exemplary embodiments of the present device are shown and described with only those components which are required to disclose the present invention. It may be that some of the necessary elements for attaching and using the present invention are not shown or are not necessarily described below, but which are well known to persons skilled in the relevant art. As will be readily appreciated by such persons, the various elements of the present invention that are described below may take on any form consistent with forms that are readily realized by persons of ordinary skill in the art having knowledge of mounting systems and container engaging systems.

A container storage apparatus that is configured pursuant to one of the preferred embodiments of the present invention is shown generally as 10 in FIGS. 3-10, 17-18 and 22-25. A container storage system using the apparatus 10 is shown as 12 in FIG. 24. A prior art storage container which may be utilized with the new apparatus 10 and system 12 of the present invention is shown as 14 in FIGS. 1 and 2. In certain embodiments of the present invention, the apparatus 10 and system 12 are primarily configured for use with the storage container 14. In other embodiments, the apparatus 10 and system 12 are structured and arranged for use with a variety of other objects 400.

Figure 1:
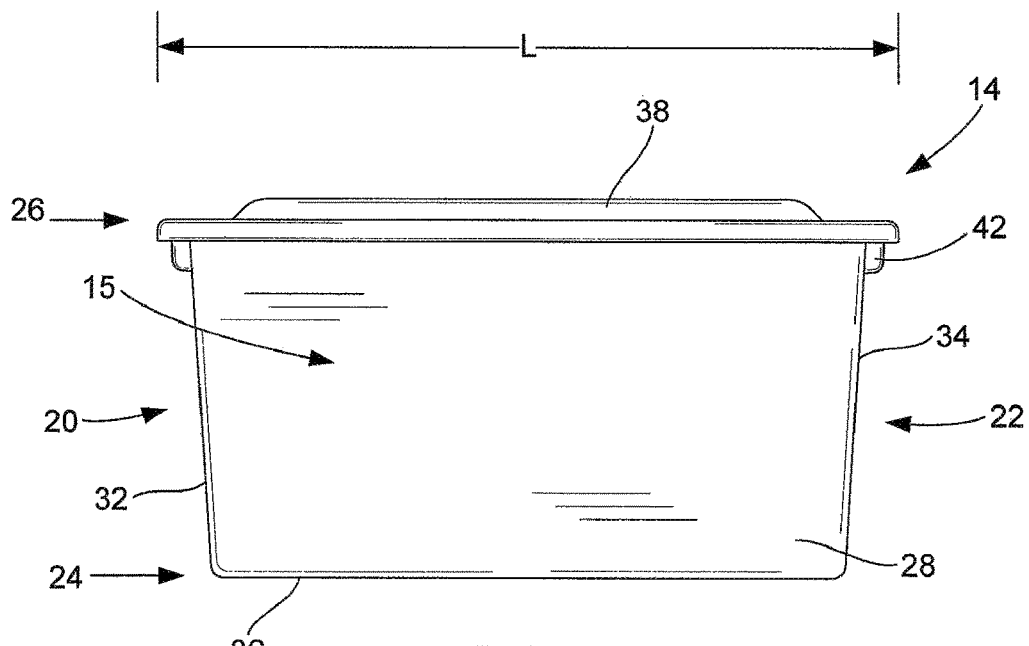
FIG. 1 is a side view of a prior art storage tote container which may be utilized with the apparatus and system of the present invention.
Figure 2:
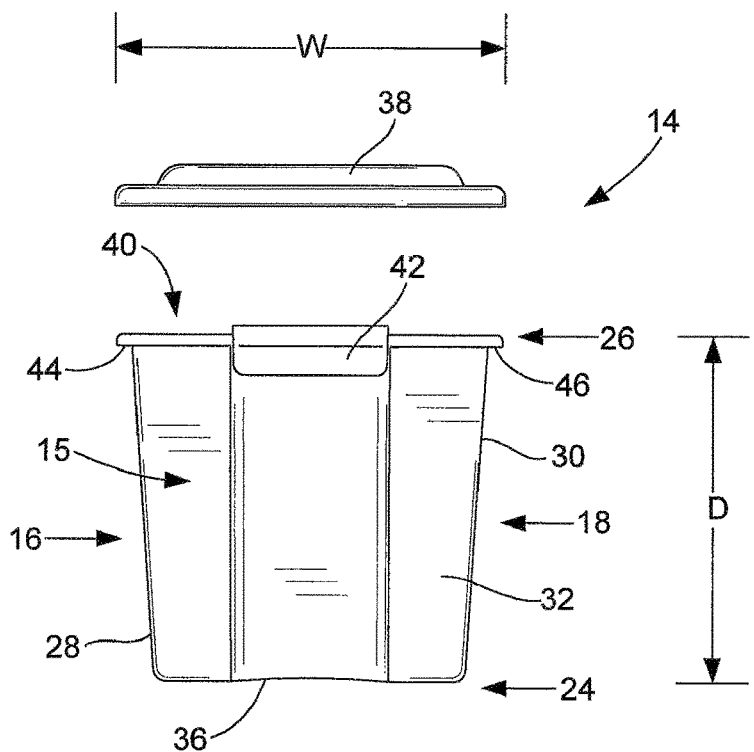
FIG. 2 is an end view of the storage tote container of FIG. 1 with the lid removed to better show the lips on the opposing sidewalls of the container.

A typical storage container 14, commonly referred to as a storage tote, for use with the apparatus 10 and system 12 has a square or rectangular shaped container body 15 with a first side 16, an opposing second side 18, a first end 20 an opposing second end 22, a lower end 24 and an upper end 26, as shown in FIGS. 1 and 2. The storage container 14 has a plurality of walls, including a first sidewall 28 at the first side 16, an opposing second sidewall 30 at the second side, a first end wall 32 at the first end 20, an opposing second end wall 34 at the second end 22, a bottom wall 36 at the lower end 24 and a lid 38 a the upper end 26 that define an interior chamber 40, shown in FIG. 2 with the lid 38 removed. As well known in the art, the lid 38 may be hingedly attached to one or more of the sidewalls 28/30 or end walls 32/34 or the lid 38 may be removably attached to the upper end 26 of the container 14, often by using the handle/latch combinations 42 at the end walls 32/34, as shown in FIGS. 1 and 2. As shown in the figures, and understood by persons in the relevant art, the width W of container body 15 is from the first side 16 to the second side 18, the length L of container body 15 is from the first end 20 to the second end 22 and the depth D of container body 15 is from the lower end 24 to the upper end 26 thereof.

For purposes of using the container 14 with the apparatus 10 and system 12 of the present invention, the container body 15 must have at least two outwardly extending lips on opposing walls of the container body 15, such as at opposing sides 16/18 or ends 20/22 (walls 28/30 or 32/34) that, as set forth below, are engaged by components of the apparatus 10. With regard to the prior art container 14 shown in FIGS. 1 and 2, the first sidewall 28 has a first lip 44 and the opposing second sidewall 30 has a second lip 46, both of which extend outwardly (i.e., in the direction away from the sidewall and the interior chamber 40) from their respective sidewalls 28/30 at or near the upper end 26, as shown in FIG. 2.

Figure 18:
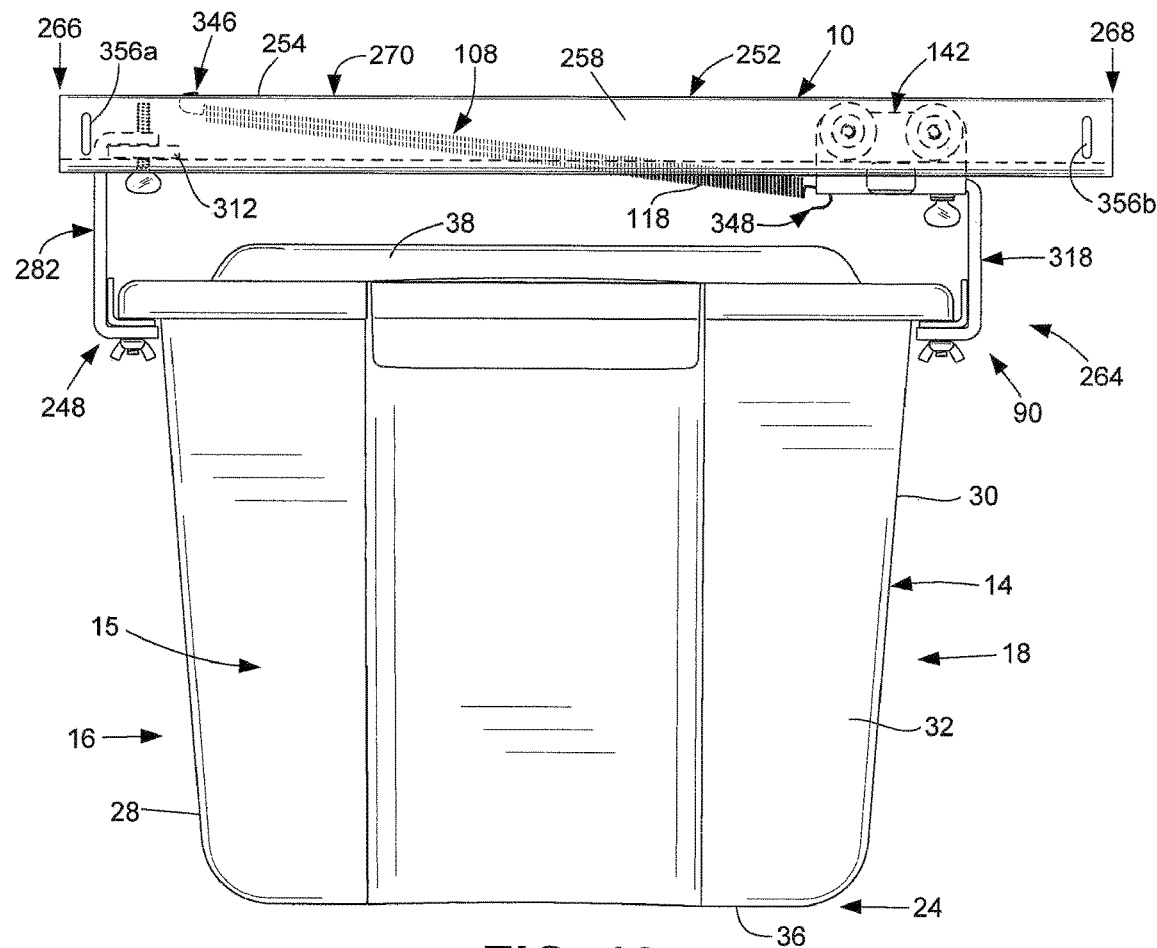
FIG. 18 is a right side view of the container storage apparatus of FIG. 17 with the storage container of FIG. 1 held in the container space between the static container support assembly and dynamic container support assembly, with the apparatus in its second or container storage position.
Figure 24:
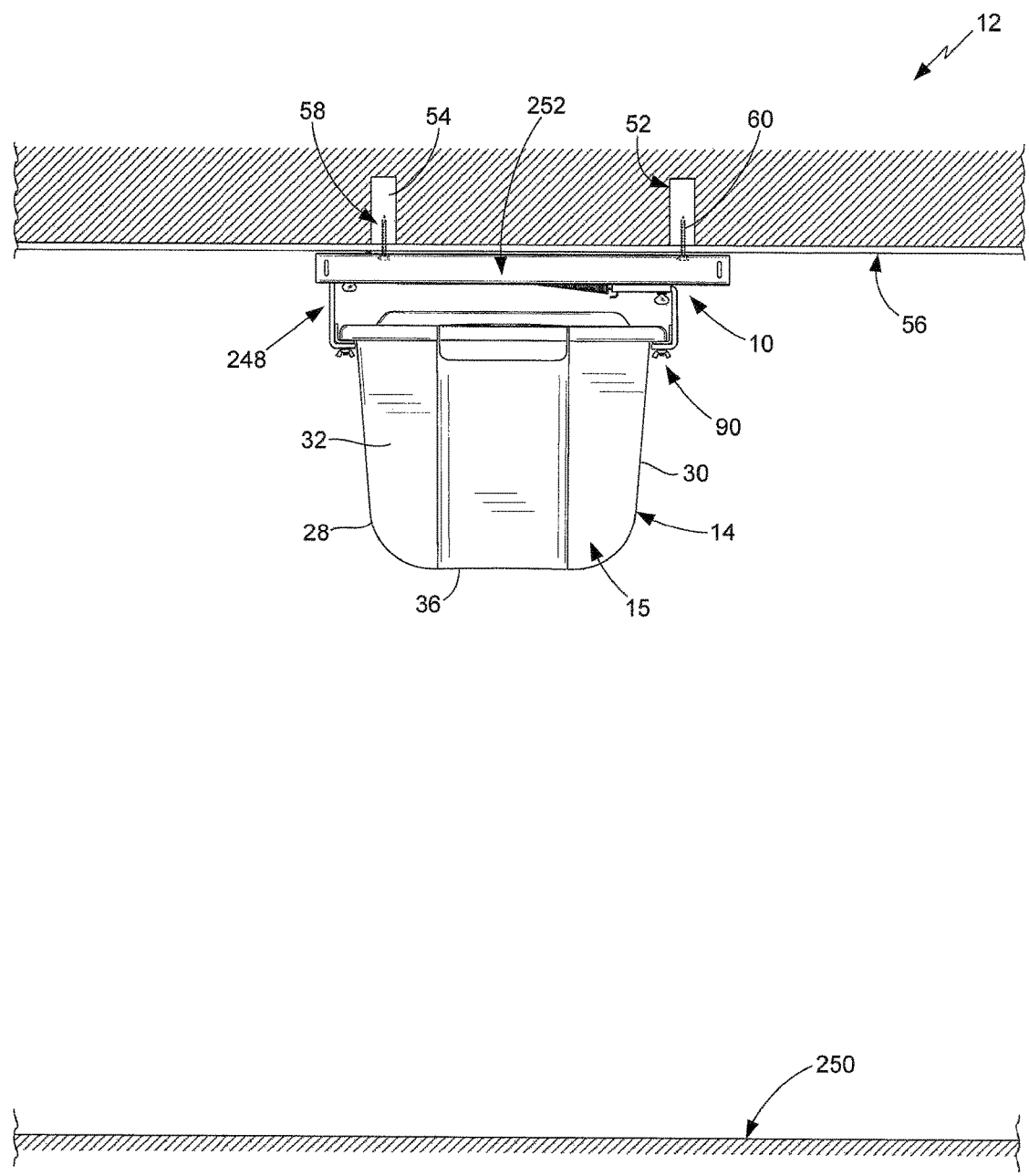
FIG. 24 is a second or right side view of the apparatus of FIG. 17 shown attached to area supports and in use to support a storage container with the bottom wall of the container above a floor, ground or other surface.
Figure 28:
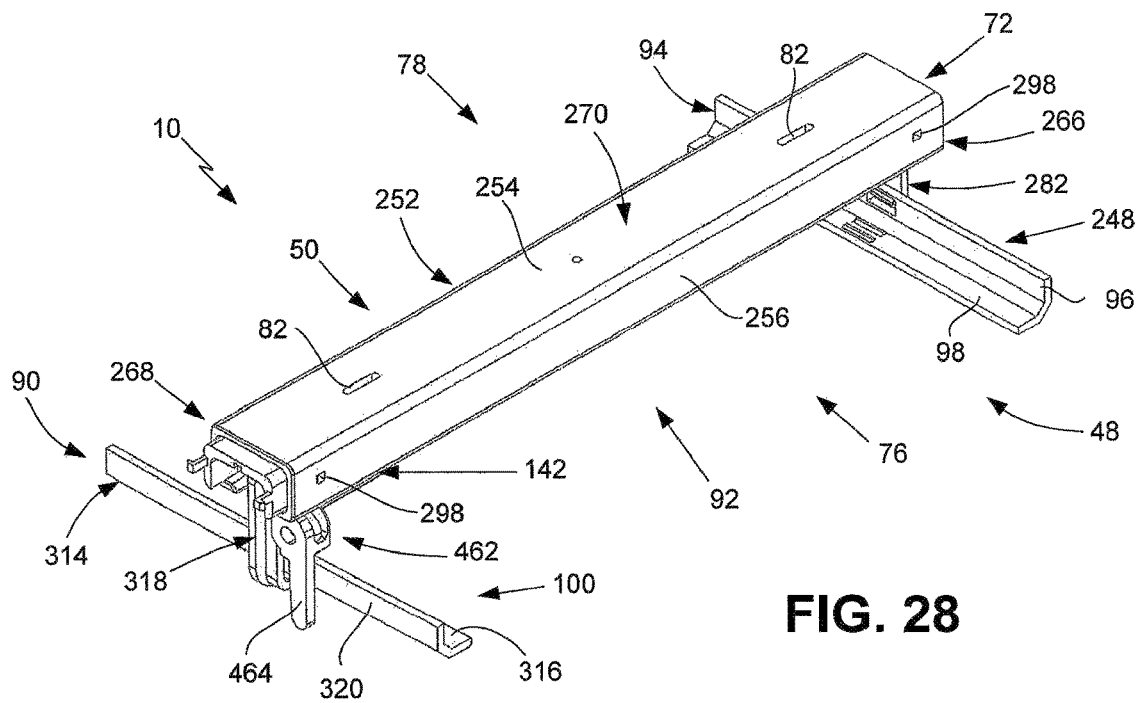
FIG. 28 is a top back perspective view of a fourth embodiment of a container storage apparatus that is configured according to the present invention, with the dynamic container support assembly fully spread apart form the static container support assembly.
Figure 29:
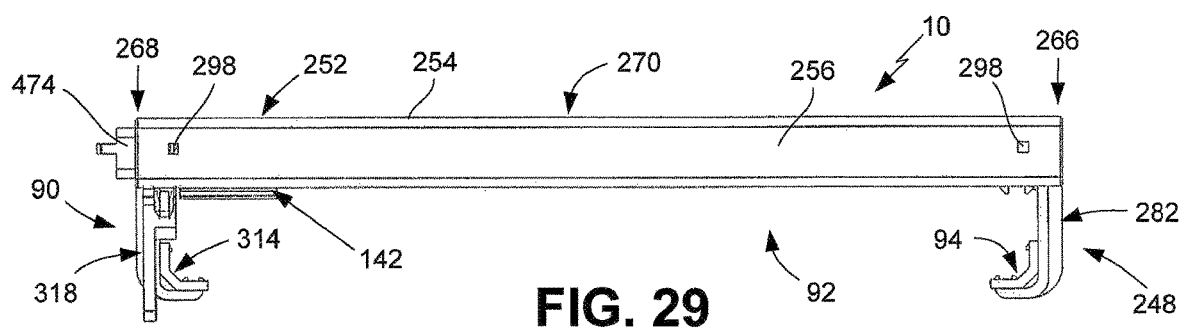
FIG. 29 is a left side view of the container storage apparatus of FIG. 28.
Figure 30:
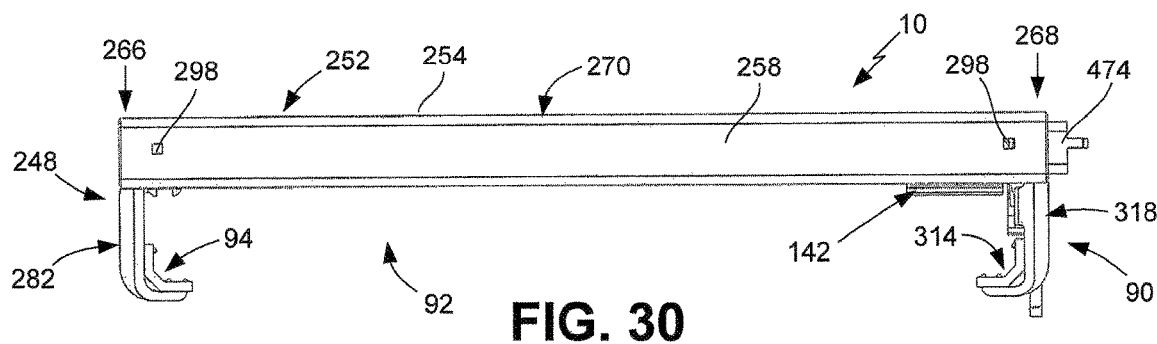
FIG. 30 is a left side view of the container storage apparatus of FIG. 28.
Figure 31:
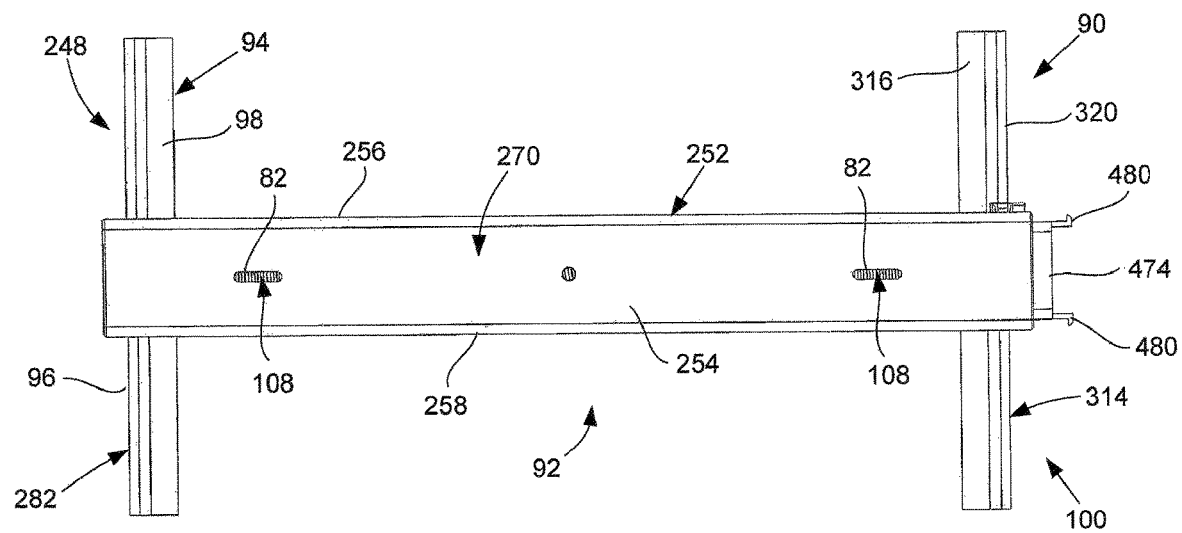
FIG. 31 is a top view of the container storage apparatus of FIG. 28.
Figure 32:
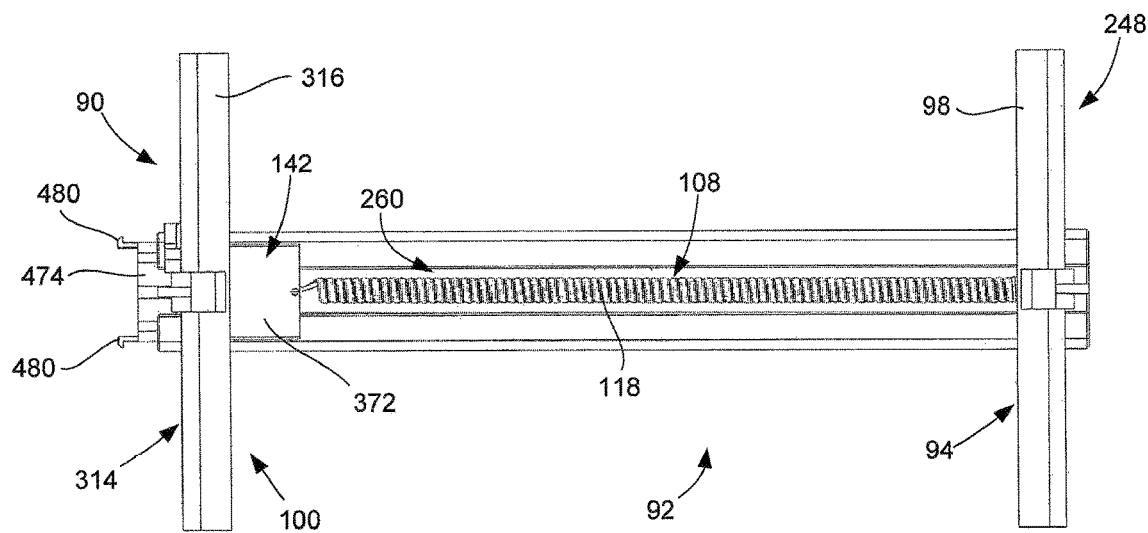
FIG. 32 is a bottom view of the container storage apparatus of FIG. 28.

As set forth in more detail below, the lips 44/46 of the container 14 are engaged by the container engaging section 48 of the apparatus 10, as shown in FIGS. 18 and 24. The container engaging section 48 is supported by a mounting section 50 of the apparatus 10 that mounts the apparatus 10 to one or more area supports 52 in the area, as shown in FIG. 24, such as the garage, shed, room, closet or the like, where the user of the apparatus 10 and system 12 of the present invention desire to store the storage containers 14. In FIG. 24, the area supports 52 are shown as a joist or other roof member 54, shown above a ceiling 56. As will be readily appreciated by persons skilled in the art, the area supports 52 may be a joist 54 (as shown), the ceiling 56 (if strong enough on its own), the roof over the area or a variety of other area supports 52 to which the mounting section 50 of the apparatus 10 can be mounted. Typically, but not exclusively, the mounting section 50 of the apparatus 10 will be securely mounted to the area supports 52 using an appropriate connecting mechanism 58, such as one or more nails, screws, bolts or other connectors 60 (shown in FIG. 24) or by welding or other appropriate mechanisms 58 depending on the materials utilized for the mounting section 50 of apparatus 10 and area supports 52. As shown in FIG. 24, the system 12 of the present invention comprises the apparatus 10, a container 14 and one or more area supports 52, whether joists 54, ceiling 56, roof or any other structurally adequate members.

As set forth in more detail below, the apparatus 10 is structured and arranged to be mounted to one or more area supports 52, such as joist 54, ceiling 56 or the like, in order to removably support one or more storage containers 14 immediately below the area supports 52 in a manner that positions the bottom wall 36 of the storage containers 14 in spaced apart relation to the floor, ground or any other lower surface 250. For the purposes of describing the present invention, the lower surface 250 may be any type of surface above which it is beneficial to place the storage container 14 (i.e., whether in a garage, house, office, vehicle or etc.).

The apparatus 10 and system 12 of the present invention comprises a unified or combined container engaging section 48 and mounting section 50, with the container engaging section 48 being structured and arranged to removably support a storage container 14 and a mounting section 50 that is structured and arranged to mount the apparatus 10 to one or more area support 52 (typically a plurality of joists or other roof members 54). The preferred configurations of the mounting section 50 of the apparatus 10 comprise a single elongated support rail 252 that is utilized as the dynamic support rail with apertures 82 that are used to mount the apparatus 10 to the area supports 52. As will be readily appreciated by persons who are skilled in the relevant art, the apparatus 10 provides either a single location for hanging a storage container 14 or, when multiple apparatuses 10 are connected together, a single linear row of apparatuses 10 for hanging multiple storage containers 14 below the area supports 52. If desired, however, the support rail 252 may be mounted, either fixedly or removably, to an upper frame that supports a series of parallel spaced apart apparatuses 10, whether each row comprises a single apparatus 10 or a plurality of apparatuses 10, for hanging a plurality of storage containers 14 below the area supports 52, particularly a ceiling 56 in a building, garage, vehicle interior and the like.

As set forth in more detail below, the support rail 252 supports various components of the container engaging section 48, namely a static container support assembly 248, a dynamic container support assembly 90 and a storage container 14 in the container space 92, as shown in FIGS. 3-10, 17-18 and 22-25. The elongated support rail 252 has a plurality of walls, namely an upper wall 254, first/left sidewall 256 and second/right sidewall 258, that define an interior channel 260 through which portions of the dynamic support assembly 90 moves (namely, as set forth below, the moving mechanism 142) as the apparatus 10 moves between a first or biased position 262 (which is the empty or default position) and a second or container support position 264, as shown with regard, respectively, to FIGS. 17 and 18. The support rail 252 has a first or front end 266 at the front side 72 of the apparatus 10 and a second or back end 268 at the back side 74 of the apparatus 10, as shown in FIGS. 3, 4, 8 and 10-18. The support rail 252 is sized and configured, as may be necessary or deemed desirable, to safely support the apparatus 10, container 14 and the items stored in the container 14 below the area supports 52 in the garage, shed, room, closet or other area and above the lower surface 250 where the apparatus 10 and system 12 will be utilized. The support rail 252 can be made out of metal, plastic, fiberglass, composites and other materials, the selection of which will generally affect the weight of the containers 14 (and their items) that can be supported by the apparatus 10.

To mount the support rail 252 to the area supports 52, the upper wall 256 of the support rail 252 has one or more apertures 82 therethrough that are utilized to securely position the upper surface 270 of the upper wall 256 in abutting engagement with, directly or indirectly, the area supports 52 or ceiling 56, as shown in FIG. 24. A connecting mechanism 58 is utilized through one or more of the apertures 82 to secure the support rail 252 to the area supports 52. As will be readily appreciated by persons who are skilled in the art, many installations of apparatus 10 will secure the support rail of the apparatus 10 to one or more wooden joists 54. As such, the connecting mechanism 58 that is utilized for mounting the apparatus 10 to the area supports 52 will include one or more connectors, such as a bolt or screw, that are fit through the apertures 82 and are inserted into or through the joists 54. In one configuration, the apertures 82 are configured as slots that extend at least substantially the length of the upper surface 270, as shown in FIGS. 3, 5, 7, 11 and 23. The use of slots as apertures 82 will provide the user with increased flexibility with regard to the positioning of the support rail relative to the area supports 52 (i.e., joists 54), as opposed to having a plurality of individual apertures 82 through the upper wall 256 or requiring the user or other person installing apparatus 10 to drill a hole through the support rail 252. If desired, however, the apertures 82 can comprise one or more circular holes through the upper wall 256 instead of slots. Typically, for such use there will be a plurality of such holes along the length of the upper wall 256 to allow the user to select which one or more of the holes are aligned with the area supports 52. As will be readily appreciated by persons skilled in the art, the support rail 252 will typically, but not exclusively, be mounted to the one or more area supports 52 using an appropriate connecting mechanism 58, such as one or more nails, screws, bolts or other connectors 60 (shown in FIG. 24) or by welding or other appropriate connecting mechanisms 58 depending on the materials utilized for support rail 252 of apparatus 10 and the area supports 52. In one embodiment of the present invention, the system 12 comprises an apparatus 10, a storage container 14, one or more area supports 52 (whether joists 54, ceiling 56, roof or any other structurally adequate members), and the lower surface 250, as shown in FIG. 24.

Figure 17:
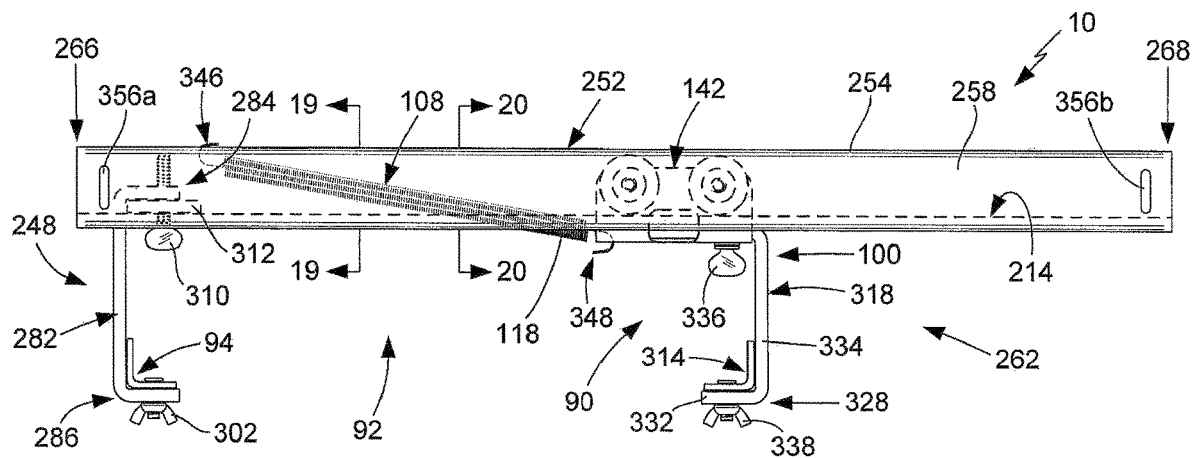
FIG. 17 is a right side view of a second embodiment of the container storage apparatus of the present invention, with the dynamic container support assembly biased by said biasing mechanism toward said static container support assembly placing the apparatus in its first or biased position.

As set forth above, the support rail 252 is structured and arranged to moveably support the dynamic container support assembly 90 as it moves toward and away from the stationary container support member 248, as shown with regard to FIGS. 17 and 18. The apparatus 10 utilizes a biasing mechanism 108 to pull the dynamic container support assembly 90 toward the static container support mechanism 248 in a manner that engages the lips 44/46 of the storage container 14 so as to securely support the storage container 14 in the container space 92 of apparatus 10, as shown in FIG. 24. To place the storage container 14 in the container space 92 of the apparatus 10 or to remove the storage container 14 from the apparatus 10, the user will press against the dynamic container support assembly 90 in the rearward direction (i.e., toward the back side 74 of the apparatus 10) to overcome the biasing mechanism 108 and push the dynamic container support assembly 90 away from the static container support assembly 248. As such, the support rail 252 is structured and arranged to moveably support the moving mechanism 142 as the dynamic support 100 moves toward and away from the stationary container support member 248 in response, respectively, to the biasing mechanism 108 placing the apparatus 10 in its biased position 262 or the user placing the apparatus 10 in its container storage position 264, as shown with regard to FIGS. 17 and 18. The moving mechanism 142 is moveably disposed inside the interior channel 260 of the support rail 252, as best shown in FIGS. 17, 18 and 25.

Figure 12:
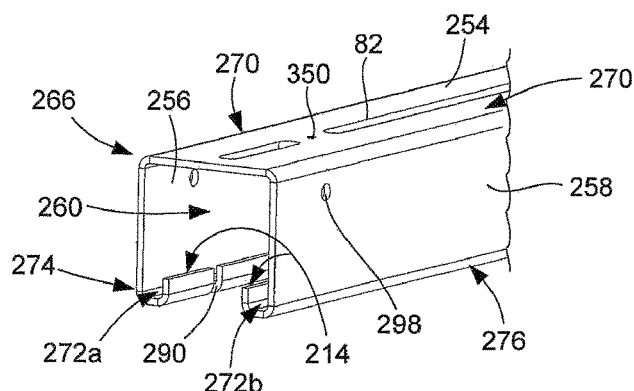
FIG. 12 is a side perspective view of the first/front end of the support rail assembly.
Figure 13:
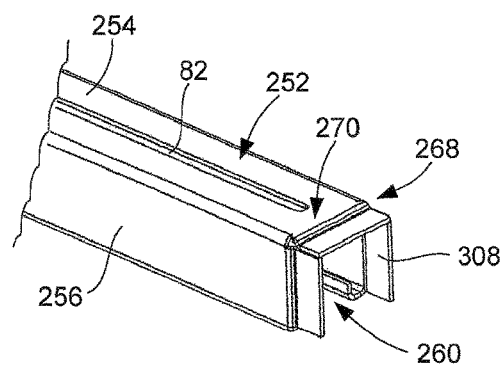
FIG. 13 is a side perspective view of the second/back end of the support rail assembly.

As set forth in more detail below, the moving mechanism 142 of the present embodiment of the present invention, best shown in FIGS. 16-18,20 and 25-27 can comprise one or more rollers, wheels or other track engaging devices 212 that are sized and configured to moveably engage a track 214 associated with support rail 252, as best shown in FIGS. 17-18, or it may comprise one or more blocks, beams, rails or other track engaging members 372 that are sized and configured to slidably engage or otherwise move along the track 214, as shown in FIGS. 25-27. In a preferred configuration, the track 214 is disposed inside the interior channel 260 defined by the walls 254/256/258 of the support rail 252. As will be readily appreciated by persons who are skilled in the art, however, in certain configurations of the apparatus 10, the moving mechanism 142 is sized and configured to fit inside the interior channel 260 and move (whether roll, slide or the like) along the track 214 defined by the support rail 252. In the embodiment shown in the various figures, the track 214 is formed by a pair of upturned sections 272a and 272b of the support rail 252, as best shown in FIGS. 12, 17 and 25. More specifically, the track 214 of the preferred configurations of the apparatus 10 of the present invention is defined by the upturned sections 272a and 272b that are integrally formed with each of the first sidewall 256 and second sidewall 258, at (respectively) the lower ends 274 and 276 of the sidewalls 256/258, such that the upturned sections 272a/272b that form the track 214 are disposed inside interior channel 260, as best shown in FIGS. 12, 17 and 25. In another embodiment, support rail 252 can comprise a pair of inwardly disposed, generally planar sections, instead of the upturned sections 252a/252b, associated with each of the sidewalls 256/258 which the moving mechanism 142 will moveably engage as dynamic support 100 moves toward and away from the static container support assembly 248, as described in more detail below. There are also various other configurations possible for the track 214 being positioned inside an interior channel 260 of the support rail 252. In addition, the track 214 may be positioned on an outer surface, or on a pair of outer surfaces, associated with the support rail 252. As will be readily appreciated by persons who are skilled in the art, the track 214 associated with the support rail 252 can be configured in a wide variety of different manners as long as the track 214 and moving mechanism 142 are both cooperatively configured with each other to allow the moving mechanism 142 to move the dynamic support 100 toward and away from the static container support assembly 248 (in response to the user or being biased by biasing mechanism 108), as shown with regard to FIGS. 17 and 18.

In one configuration of the apparatus 10 of the present invention, the support rail 252 is or comprises a Unistrut® slotted channel, such as of the type that are available from Atkore International, Inc., which is or can be provided with the walls 254/256/258, apertures 82 (whether slots or holes) and upturned sections 272a/272b, as best shown in FIG. 12. The configuration and use of Unistrut® channels is generally well known in the construction and related industries. In another embodiment, the support rail 252 is made from metal, plastic, fiberglass, composites or other materials into the general shape shown in the figures or as may otherwise be appropriate for the support rail 252 to function as required for the apparatus 10 and system 12.

As set forth above, the apparatus 10 generally comprises a static container support assembly 248 and a dynamic container support assembly 90 that define the container space 92 therebetween, as best shown in FIGS. 3, 5, 7-10, 17 and 22-23, and which cooperate together to engage and hold the container 14 in the container space 92 so as to store the container 14 in the apparatus 10, as shown in FIGS. 18 and 24. As set forth in more detail below, relative to the support rail 252, the static container support assembly 248 is stationary so as to provide a support surface that will engage one of the lips 44/46 of a container 14 and the dynamic container support assembly 90 moves inward and outward (i.e., toward the front side 72 or back side 74 of the apparatus 10), the amount of which depends on the width W or length L of the container 14, to engage the opposite facing lip 44/46 of the container 14 in order to securely, but easily removably, hold the container 14 in the apparatus 10, as shown in FIGS. 18 and 24.

Figure 3:
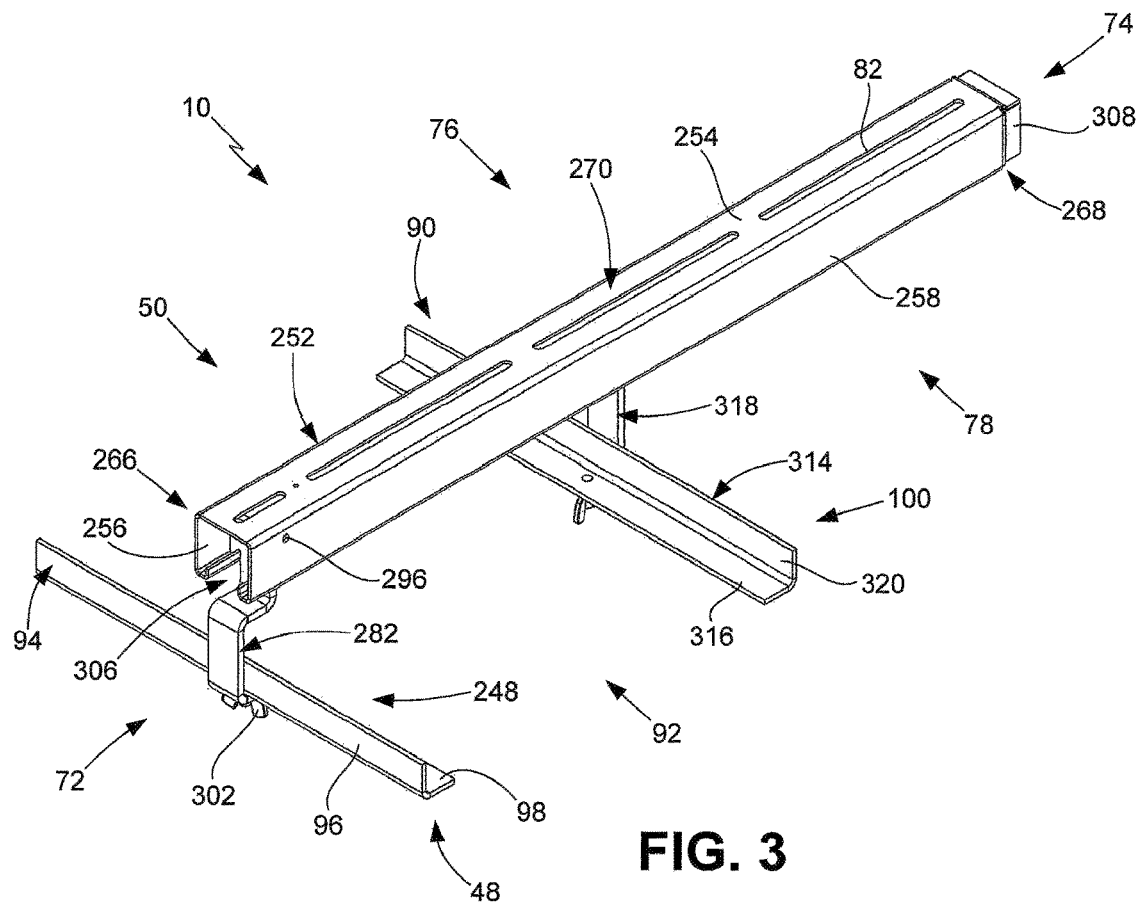
FIG. 3 is a top front perspective view of a first embodiment of a container storage apparatus that is configured according to the present invention, with the dynamic container support assembly biased by said biasing mechanism toward said static container support assembly.
Figure 4:
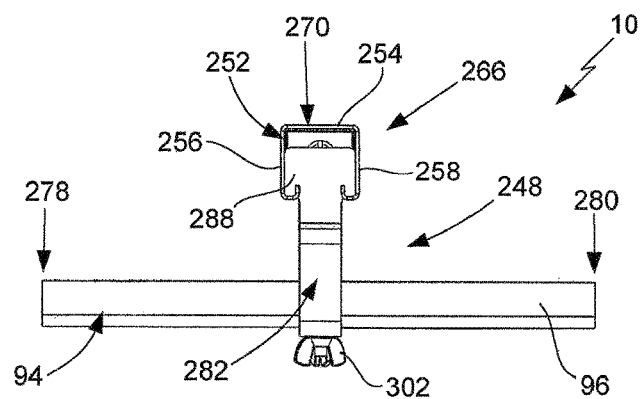
FIG. 4 is a front view of the container storage apparatus of FIG. 3.
Figure 5:
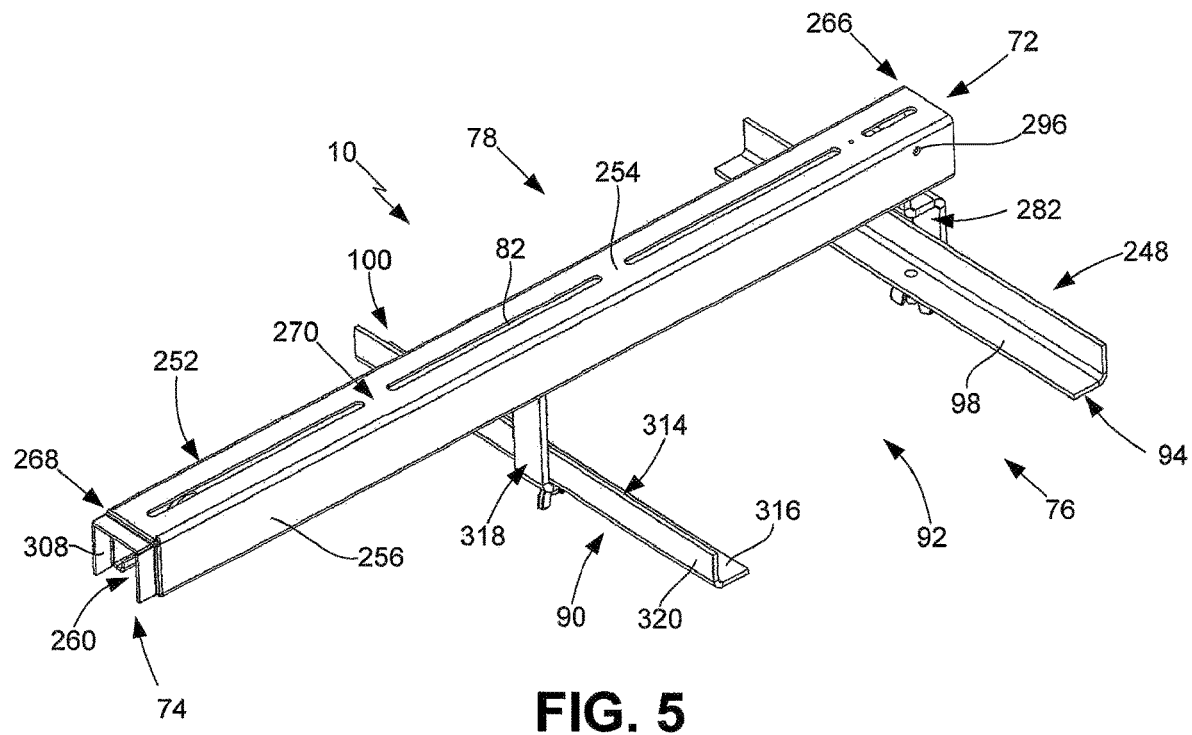
FIG. 5 is a top back perspective view of the container storage apparatus of FIG. 3.

In the embodiment shown in the figures, the static container support assembly 248 comprises an elongated L-shaped static support member 94 having a first and left end 278 at the first/left side 76 of the apparatus 10 and a second or right end 280 at the second/right side 78 of the apparatus 10, as best shown in FIGS. 3-4. The static support member 94 has a vertical member 96 and a horizontally disposed lip engaging member 98, as shown in FIGS. 3 and 5. In the preferred embodiments, the static support member 94 is perpendicular to the support rail 252, as best shown in FIGS. 3-5, 7 and 9. The lip engaging member 98 attaches to, directly or indirectly, the support rail 252, typically at or near one end 266/268 of the support rail 252 (such as the first end 266 shown in FIGS. 3-5, 7-10, 17-18 and 22-24). The lip engaging member 98 is sized and configured to engage one of the lips 44/46 of the container 14, as shown in FIGS. 18 and 24. In one embodiment, the lip engaging member 98 is substantially horizontal so as to extend inwardly into the container space 92 so a lip, such as first lip 44 as shown in FIGS. 18 and 24, of the container 14 will be positioned on top of or otherwise supported by the lip engaging member 98 when the container 14 is being pressed against the static container support assembly 248 by the dynamic container support assembly 90. As will be readily appreciated by persons skilled in the relevant art, lip engaging member 98 can be of a wide variety of different sizes and configurations, including the L-shaped member shown in the figures, a V-shaped member that has an upwardly angled member, a curved or hook-like end and the like that engages a lip 44/46 of the container 14 to hold one side 16/18 or one end 20/22 of container 14. The static support member 94 should have a length (i.e., from first end 278 to its second end 280) that will be sufficient to safely support the desired containers 14. As with most of the other components of the apparatus 10, the static support member 94 can be made out of a wide variety of materials, with the various components thereof being attached or integral to each other and attached to or integral with support rail 252 of mounting section 50.

Figure 8:
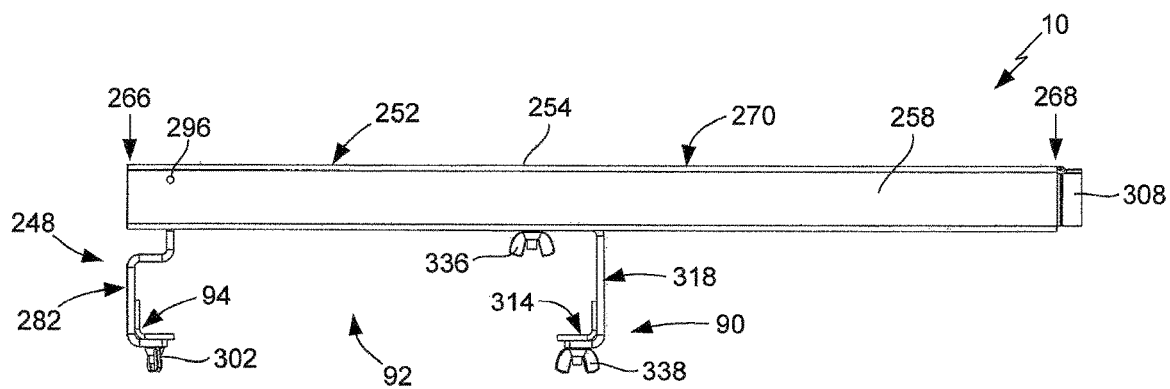
FIG. 8 is a right side view of the container storage apparatus of FIG. 3.
Figure 9:
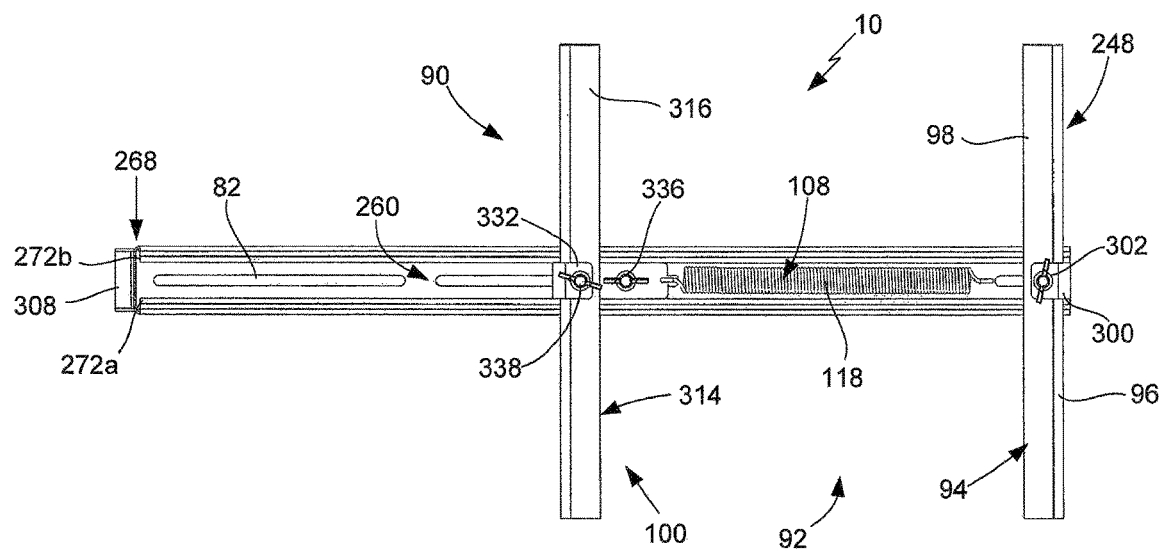
FIG. 9 is a bottom view of the container storage apparatus of FIG. 3.
Figure 10:
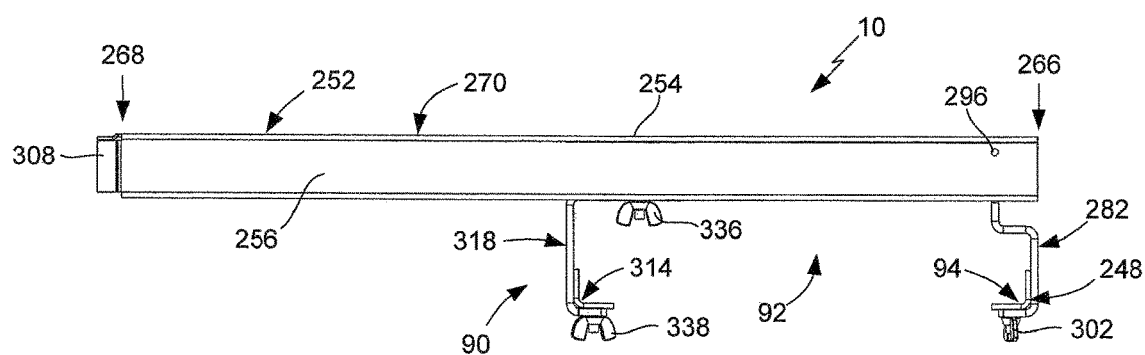
FIG. 10 is a left view of the container storage apparatus of FIG. 3.
Figure 11:
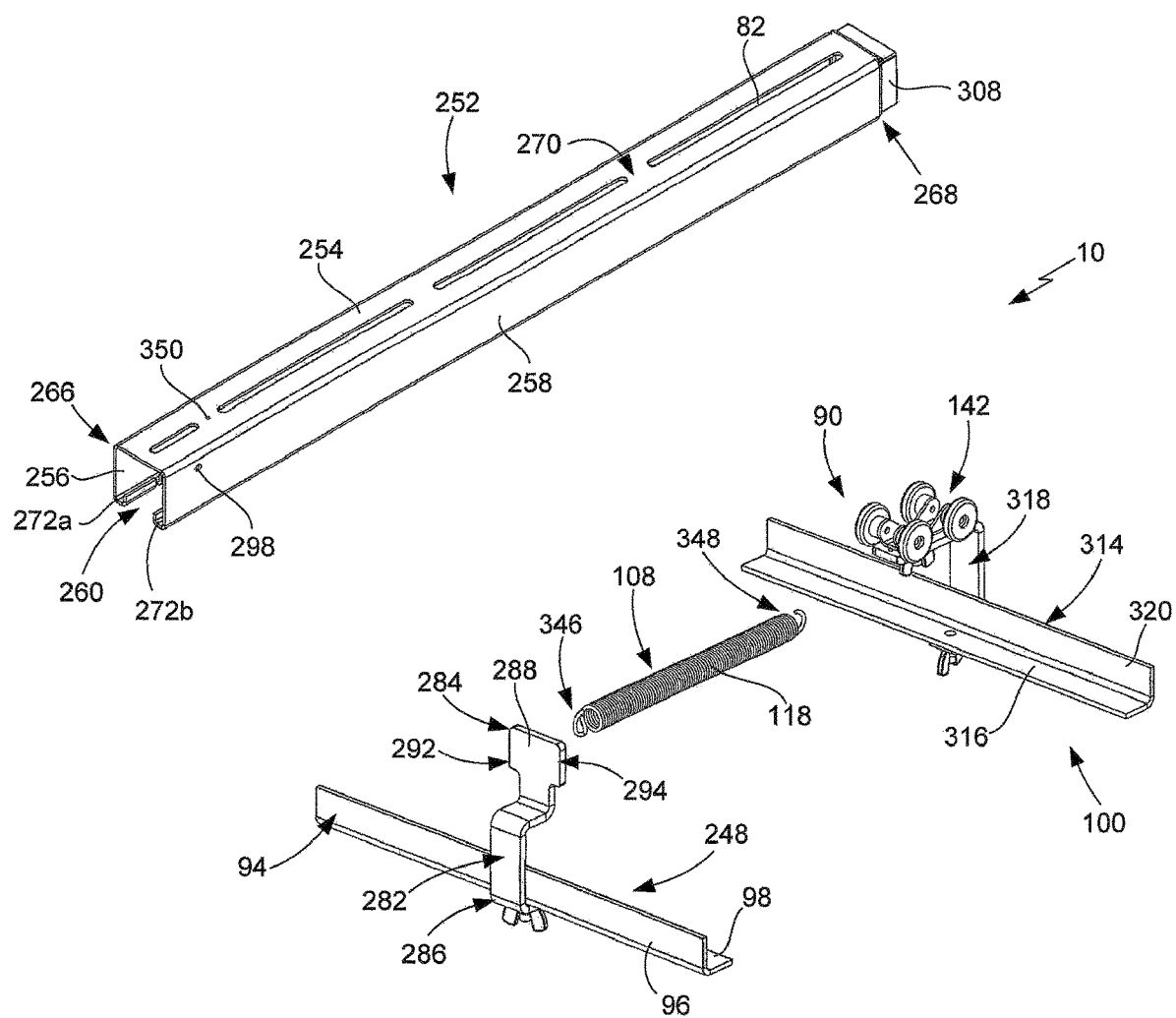
FIG. 11 is a partially exploded top front perspective view of the container storage apparatus of FIG. 3 showing the static container support assembly and the dynamic container support assembly separate from the support rail assembly.
Figure 14:
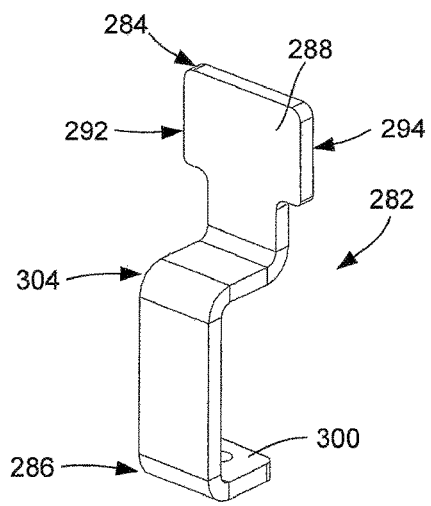
FIG. 14 is a side perspective view of the static support bracket of the static container support assembly.

In the embodiments shown in the figures, the static container support assembly 248 of apparatus 10 also comprises a static bracket 282 that connects the static support member 94 to the support rail 252, as best shown in FIGS. 3-4, 11, 17-19 and 22-24. The static bracket 282 has an upper end 284 that is disposed in the interior channel 260 to connect the static bracket 282 to the support rail 252 and a lower end 286 that connects to or is integral with the static support member 94, as best shown in FIG. 11. The upper end 284 can be attached to or integral with the support rail 252. In the embodiments shown in the figures, the static bracket 282 has an enlarged section 288 towards the upper end 284 thereof that is sized and configured to removably fit within the interior channel 260 by engaging a cut-out section 290 in the upturned sections 272a/272b, as best shown in FIGS. 3, 11-12 and 14. The sides 292 and 294 of the enlarged section 288 generally abut the interior surfaces of the sidewalls 256/258, respectively, when the static bracket 282 is positioned inside the interior channel 260 of the support member 252, as best shown in FIG. 4. A set screw or like connector 296 (shown in FIGS. 3, 5, 8 and 10) can be inserted through an aperture 298 (shown in FIGS. 11-12) on each of the sidewalls 256/258 to engage the sides 292/294 of the enlarged section 288 to secure the static bracket 282 and, therefore, static container support assembly 248, to the support rail 252 so the static bracket 282 will not move relative to the support rail 252, thereby providing the stationary component of the new apparatus 10 of the present invention. As best shown in FIG. 14, the lower end 286 of the static bracket 282 has an inwardly disposed static member support 300 that connects to or is integral with the static support member 94, as best shown in FIGS. 8 and 10, so as to position the static support member 94 where it will engage the storage container 14 when apparatus 10 is in use. In the configuration shown in the relevant figures, a connecting element 302 removably interconnects the static support member 94 to the static member support 300 of the static bracket 282, as shown in FIGS. 4 and 8-10.

In the embodiment of FIGS. 3-16, static bracket 282 also comprises an offset area 304 (best shown in FIG. 14) that positions the enlarged section 288 inward so as to provide an insert area 306 (best shown in FIG. 3) that is sized and configured to removably receive an extension section 308 that is at the second end 268 of each support rail 252 so the user can easily connect two adjacent apparatuses 10 together, with the support rails 252 thereof being adjacent in an end-to-end manner to store multiple storage containers 14. The configuration and use of such connections is described in more detail below.

Figure 19:
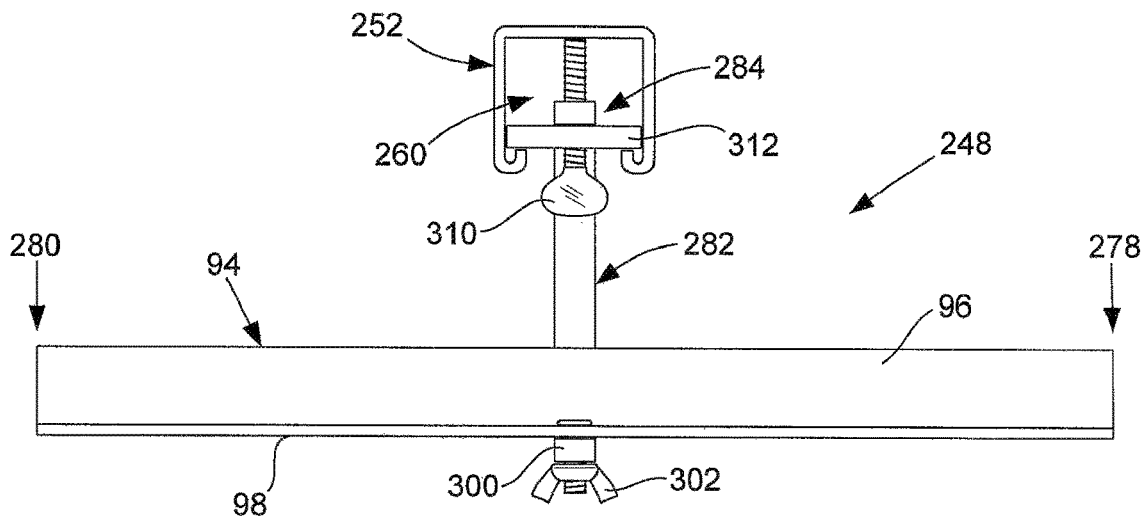
FIG. 19 is a back view of the static container support assembly of the container storage apparatus of FIG. 17.
Figure 20:
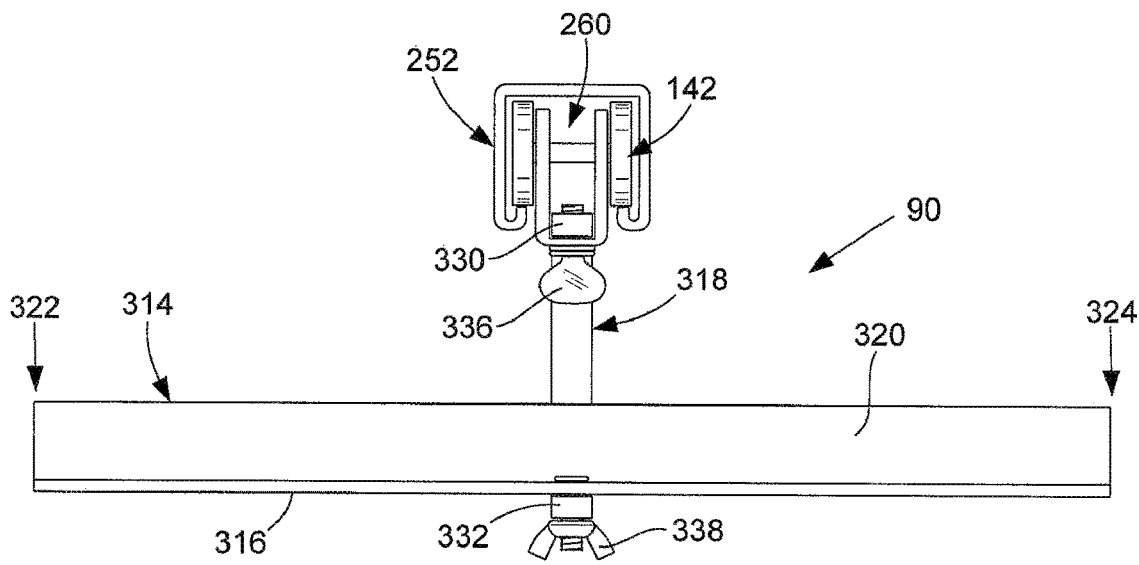
FIG. 20 is a front view of the dynamic container support assembly of the container storage apparatus of FIG. 17.
Figure 21:
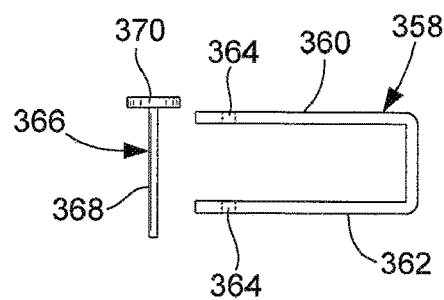
FIG. 21 is a top view of a connector bracket and joining mechanism utilized to connect the container storage apparatus of FIG. 17 to a second container storage apparatus.

In the configurations shown in FIGS. 17-27, the static bracket 282 is generally U-shaped with the lower end 286 of the static bracket 282 secured to the static support member 94 with a connecting element 302, as best shown in FIGS. 17-19. As also shown in these figures, the upper end 284 of the static bracket 282 has a threaded aperture (not shown) through which a cooperatively configured threaded connecting element 310 is threadably received. A clamping member 312, which also has an aperture (not shown) through which the connecting element 310 passes, is placed below the upper end 284 of the static bracket 282. In use, when the connecting element 310 is tightened by the user, the upper end thereof will abuttingly engage the interior surface of the upper wall 254 of the support rail 252 to cause the upper end 284 of the U-shaped static bracket 282 to press downward against the clamping member 312, which is in abutting relation with the upturned sections 272a/272b, to clamp the static bracket 282 to the support rail 252, as best shown in FIGS. 17-18, to hold the static container support assembly 248 securely in place to provide the stationary component for the new apparatus 10. As set forth above, during use of apparatus 10 the dynamic container support assembly 90 moves toward and away from the static container support assembly 248.

As set forth above, the dynamic container support assembly 90 is structured and arranged to move inward and outward relative to the container space 92 to, respectively, either engage and hold the container 14, by one of the lips 44/46 thereof (as shown in FIGS. 18 and 24), in the container space 92 or for removal of the container 14 from the apparatus 10 and/or placement of a wider or longer container 14 in the container space 92. To accomplish the objectives of engaging a lip 44/46 of the container 14 and moving inward and outward relative to the container space 92, the dynamic container support assembly 90 comprises a dynamic support 100 that is structured and arranged to removably engage and secure the container 14 in apparatus 10. The dynamic support 100 has an elongated dynamic support member 314, which in the preferred embodiments is perpendicular to the support rail 252, with a lip engaging member 316 attached thereto or integral therewith that is sized and configured to engage one of the lips 44/46 of storage container 14, a moving mechanism 142 that allows the dynamic support member 314 to move relative to the support rail 252 and a biasing mechanism 108 that bias the dynamic support member 314, with its lip engaging member 316, into the container space 92 and against the storage container 14 (when the apparatus 10 is being utilized to hold the storage container 14, as shown in FIGS. 18 and 24). As with the other components of the apparatus 10, the dynamic support 100 of the present embodiment can be made out of metal, plastic, fiberglass, composites or other materials that, among other factors, are selected to be appropriate for the weight of the containers 14 and the items that are stored therein.

Figure 6:
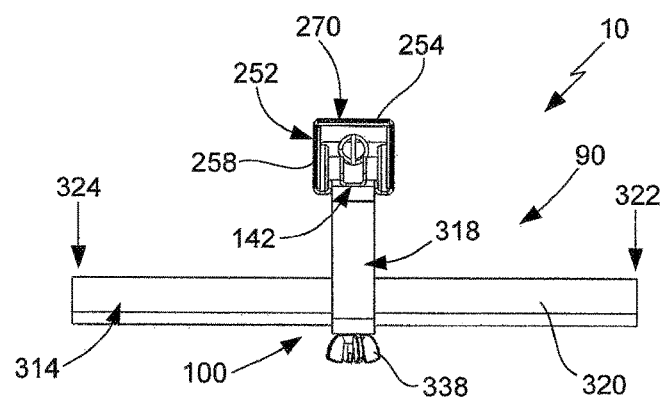
FIG. 6 is a back view of the container storage apparatus of FIG. 3.
Figure 7:
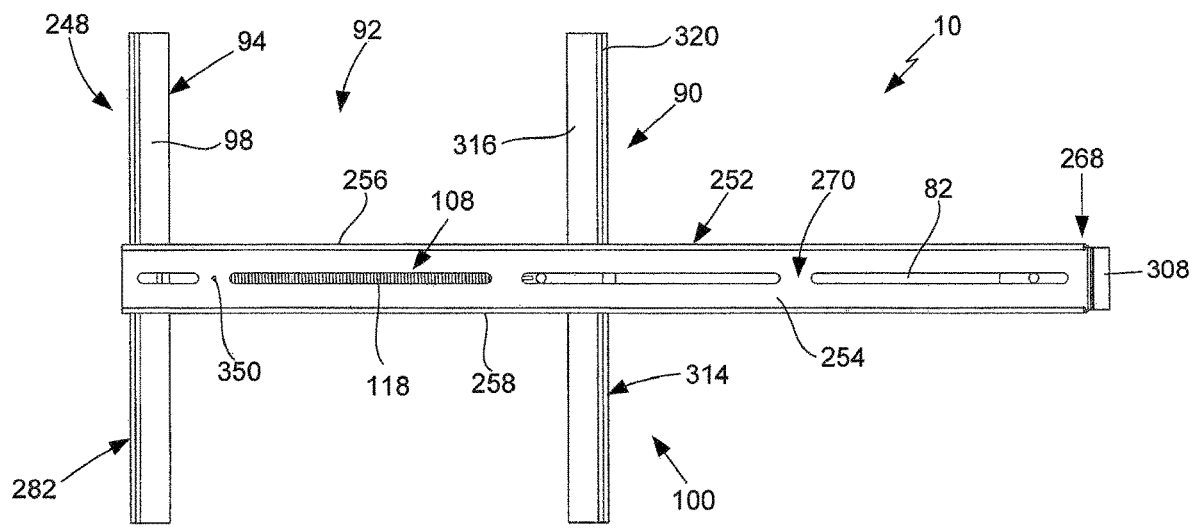
FIG. 7 is a top view of the container storage apparatus of FIG. 3.

In addition to the elongated dynamic support member 314 and lip engaging member 316, the dynamic support 100 comprises a dynamic bracket 318 that interconnects the dynamic support member 314 and the moving mechanism 142. As a result of the dynamic bracket 318, the lip engaging member 316 will move inward and outward with the movement of the moving mechanism 142, which as set forth in more detail below, moves inward in response to the biasing mechanism 108 or outward in response to the user overcoming the biasing force of the biasing mechanism 108. The dynamic bracket 318 is connected to or integral with both the lip engaging member 316 and the moving mechanism 142. In one configuration, the dynamic support member 314 is an L-shaped member having the lip engaging member 316 as the horizontal portion and a vertical member 320 as the vertical portion, as best shown in FIGS. 3, 5, 8, 10-11, 17-18, 22 and 24. The dynamic support member 314 has a first or left end 322 at the first/left side 76 of the apparatus 10 and a second or right end 324 at a second/right side 78 of the apparatus 10, as shown in FIGS. 5-6. Lip engaging member 316 is sized and configured to engage one of the lips 44/46 of container 14, as shown in FIGS. 18 and 24. In one configuration, lip engaging member 316 is substantially horizontal so as to extend inwardly into the container space 92 to engage a lip, such as second lip 46 as shown in FIGS. 18 and 24, will be positioned on top of the lip engaging member 316 when the container 14 is being pressed against the static container support assembly 248 by the dynamic container support assembly 90. As will be readily appreciated by persons skilled in the relevant art, the lip engaging member 316 can be of a wide variety of different sizes and configurations, such as the L-shaped member shown, a V-shaped member having an upwardly angled portion, a curved or hook-like end and the like that will engage a lip 44/46 of the container 14 to hold one side 16/18 or one end 20/22 thereof. The dynamic support member 314 should have a length (i.e., from its first end 322 to its second end 324) that will be sufficient to safely support the desired containers 14. As with most of the other components of apparatus 10, the dynamic support member 314 can be made out of a wide variety of materials, with the various components thereof being attached to or integral with each other and attached to or integral with the support rail 252 of mounting section 50.

Figure 15:
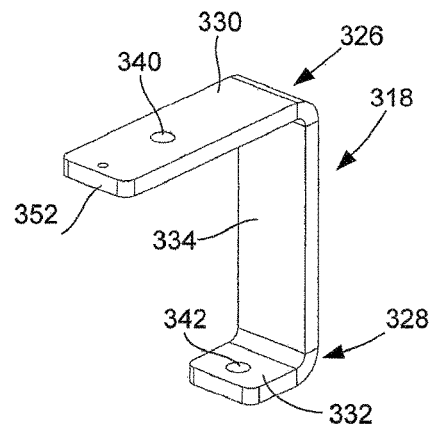
FIG. 15 is a side perspective view of the dynamic support bracket of the dynamic container support assembly.

The dynamic bracket 318 has an upper end 326, which in some configurations is disposed in the interior channel 260, that connects the dynamic bracket 318 to the moving mechanism 142 inside the support rail 252 and a lower end 328 that connects to or is integral with the dynamic support member 314, as best shown in FIGS. 11, 15, 17, 20 and 25. The dynamic bracket 314 shown in the figures comprises an upper support member 330 at the upper end 326, a lower support member 332 at the lower end 328 and a vertically disposed connecting member 334 that interconnects the upper 330 and lower 332 support members, as best shown in FIGS. 15 and 26, that together form a generally U-shaped dynamic bracket 318. In the configurations shown in the figures, the upper support member 330 of the dynamic bracket 318 is connected to the moving mechanism 142 with a bolt, screw or other connecting element 336, as best shown in FIGS. 19 and 26, and the lower support member 332 is connected to the dynamic support member 314 with a bolt, screw or other connecting element 338, as best shown in FIGS. 6, 9-11, 17-18, 20 and 25-26. In these configurations, the connecting element 336 passes through aperture 340 in the upper support member 330 to connect to the moving mechanism 142. The connecting element 338 passes through the aperture 342 in the lower support member 332 to connect to the dynamic support member 314. In alternative configurations of the apparatus 10 of the present invention, one or more of the various components described above are integrally formed or fixedly attached to each other by welding, adhesives or other means appropriate for the materials that are selected for such components. As set forth below, however, in a preferred configuration, the components are easily disassembled so the apparatus 10 can be easily stored and shipped.

Figure 16:
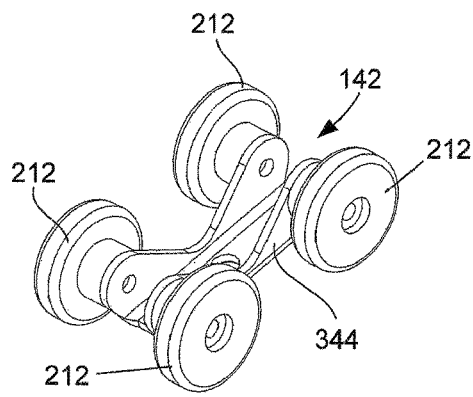
FIG. 16 is a side perspective view of the moving mechanism of the dynamic container support assembly.

In the first and second embodiments of the new apparatus 10 of the present invention, the moving mechanism 142 has four track engaging devices 212, as best shown in FIG. 16. In these configurations, the track engaging devices 212, which are rotatably attached to a mechanism frame 344 utilizing appropriately configured axles, bearings or the like, are sized and configured to moveably engage the track 214 associated with the support rail 252. The track engaging devices 212 are sized and configured to rotatably engage the upper end of the upturned sections 272a and 272b that form the track 214 inside the interior channel 260 of the support rail 252, as best shown in FIGS. 6, 17-18 and 20. The moving mechanism 142 should be cooperatively sized and configured with the channel height 374 (which is the distance between the top of the track 214 and the interior surface of the upper wall 254 of the support rail 252) to prevent the moving mechanism 142 from tilting forward or rearward while moving along the track 214. In the first and second embodiments, the track engaging devices 212 are sized and configured to be slightly less or even substantially the same as the channel height 374. As set forth above, moving mechanism 142 connects to the dynamic bracket 318. In the figures, the mechanism frame 344 is connected to the upper support member 330 with the connecting element 336. Alternatively, the mechanism frame 344 may be integrally formed with or fixedly attached to the upper support member 330 of the dynamic bracket 318.

In the third embodiment of the apparatus 10 of the present invention, shown in FIGS. 25-27, the moving mechanism 142 comprises one or more track engaging members 372. In the figures, the track engaging member 372 is a single block material which is selected for its ability to slidably engage the track 214. More specifically, the track engaging member 372 is a block of material that is selected for its ability to slide along the track 214 formed from the pair of upturned sections 272a/272b. In the configuration shown in FIGS. 25-26, the track engaging member 372 is sized and configured to slide along the track 214 inside the interior channel 260 formed by the support rail 252. In one configuration, the block of material that forms the track engaging member 72 has a front end 376, back end 378, left or first side 380, second or right side 382, top side 384 and bottom side 386, as best shown in FIGS. 26-27. In the configuration shown, the track engaging member 372 has a block length that is sized to fit on the upper support member 330 of the dynamic bracket 318, a block width that is sized to closely fit between the inner surfaces of the two sidewalls 256/258 of the support member 252 and a block height that is sized to closely fit between the top of the rail 214 and the inner surface of the upper wall 254 (i.e., channel height 374), as shown in FIG. 25. In the preferred configuration, the size of the block that defines the track engaging member 372 is selected to snugly (but not overly tight) fit in the interior channel 260 of the support member 252 so that it will be able to easily move forward and rearward therein without rocking, tilting or other undesirable movement. The material selected for the track engaging member 372 should be made from a material that can relatively easily slide along the track 214 and do so without incurring significant wear (over time) taking into account the likely uses for the new apparatus 10 and system 12 of the present invention. In one configuration, the track engaging member 372 is made from or comprises a thermoplastic such as Delrin® (acetal homopolymer resin available from DuPont®), which is known for its use in high load mechanical applications due to the material's combination of low friction and high wear resistance with stiffness and strength (which often results in it being used to replace metal components).

The track engaging member 372 has an upper surface 388 at the top side 384 and a lower surface 390 at the bottom side 286, as best shown in FIGS. 26 and 27. The upper surface 388 of the block that forms the track engaging member 372 is provided with a groove 392 along the block length (from front end 376 to back end 378), as shown in FIG. 27, that is sized and configured to allow the track engaging member 372 to easily slide under and past the connectors 60 or other connecting mechanisms 58 that are utilized to secure the apparatus 10 to the area supports 52 without damaging the upper surface 388 of the track engaging member 372. If desired, the groove 392 may be lined with a material selected to reduce the likelihood of damage to the track engaging member 372 from any incidental contact with the connecting mechanism 58 or the upper portion of the block that forms the track engaging member 372 may be made out of different materials. Other configurations for the track engaging member 372 can be used to prevent damage from any contact with the connecting mechanism 58. In a preferred configuration, the lower surface 390 of the track engaging member 372 has one or more apertures 394 that are each sized and configured to receive one of the one or more connecting elements 336 that are utilized to hold the track engaging member 372 to the upper support member 330 of dynamic bracket 318, as shown in FIG. 26.

In the embodiment shown in FIGS. 25-27, the second end 348 of the spring 118 attaches to the spring aperture 352 in the upper member 330 of the dynamic bracket 318, as shown in FIGS. 25 and 26. Alternatively, the spring 118 can be attached directly to the track engaging member 372. As set forth above, the upper support member 330 of the dynamic bracket 318 is connected to the track engaging member 372 (of moving mechanism 142) with a bolt, screw or other connecting element 336, as shown in FIG. 26, and the lower support member 332 is connected to the dynamic support member 314 with a bolt, screw or other connecting element 338, as also shown in FIG. 26. Alternatively, the track engaging member 372 may be integrally formed with or fixedly attached (i.e., with an adhesive) to the dynamic bracket 318. In any configuration, the track engaging member 372 is configured to move forwardly and rearwardly along the track 214 so as to move the dynamic bracket 318 forward or rearward to expand or contract the container area 92.

As will be readily appreciated by persons skilled in the relevant art, the moving mechanism 142 can be configured in a wide variety of different manners and utilize a variety of different components as the track engaging devices 212, such as wheels, rollers and the like that move along a track 214 (whether it is disposed inside the support rail 252 as shown in the figures or not) or the track engaging member 372. In addition, the moving mechanism 142 can have less or more track engaging devices 212 than shown in the figures of the fourth embodiment, use a combination of wheels, rollers and/or other devices that can move along the track 214 or be a combination of track engaging devices 212 and track engaging members 372, including along the upturned sections 272 or along outer edges (not shown) of the support rail 252, as shown with regard to the second embodiment. As such, the moving mechanisms 142 shown in the figures are intended to be representative of types of a mechanism that can be utilized with the present invention to allow the dynamic support 100 to move forward and rearward along the length (or most thereof) of the support rail 252 in response to the user or the biasing force of the biasing mechanism 108.

As set forth above, the biasing mechanism 108 of apparatus 10 is utilized to bias the dynamic container support assembly 90 toward the static container support assembly 248 such that when a storage container 14 is in the container space 92, the container 14 will be engaged by the dynamic support member 314 of the dynamic container support assembly 90 and the static support member 94 of the static container support assembly 248 to securely hold the container 14 in the apparatus 10. As shown in FIG. 24, the apparatus 10 will suspend the container 14 below the area supports 52 such that the bottom wall 36 of the container 14 is disposed in spaced apart relation to a lower surface 250, such as a floor, ground or the like. In a preferred configuration, biasing mechanism 108 comprises a spring 118, as best shown in FIGS. 9, 11, 17-18, 22 and 24. The biasing mechanism 108 is sized and configured to be disposed generally inside the interior channel 260 and to interconnect a stationary component, such as static container support assembly 248 or support rail 252, and a moveable component of the dynamic container support assembly 90. The biasing mechanism 108 has a first end 346 that connects to the stationary component and a second end 348 that connects to the moveable component, as shown in the partially exploded view of FIG. 11. In the configuration shown in the figures, the first end 346 of the spring 118 connects to a spring aperture 350 in the upper wall 254 of the support rail 252 and the second end 348 of the spring 118 connects to a spring aperture 352 in the upper support member 330 of the dynamic bracket 318, as best shown in FIGS. 7, 11-12, 15 and 18. The spring 118, or other biasing mechanism 108, should be selected so as to have sufficient biasing force to press the lip engaging member 316 of the dynamic support 100 tightly against the wall 28/30/32/34 of the storage container 14 and maintain the pressure at the lip 44/46 of the container 14 with sufficient force to hold the storage container 14 in place in the container space 92 without crushing or otherwise damaging the container 14. In addition, the spring 118 or other biasing mechanism 108 should not have a biasing force that is so strong that it is difficult for the typical person who will be placing or removing the container 14 into or from the container space 92 to move the dynamic support 100 in a direction away from the static container support assembly 248 so as to expand the container space 92 for a container 14.

The apparatus 10 can comprise a plurality of support rails 252 mounted to an upper frame (not shown), with each support rail 252 having the static container support assembly 248 and dynamic container support assembly 90 associated therewith for a parallel arrangement of storing a plurality of storage containers 14. In the preferred configurations, however, the apparatus 10 is configured for a linear or an end-to-end arrangement of apparatuses 10, as shown in FIGS. 22 and 23, to receive and store a plurality of storage containers 14.

In the configuration of the apparatus 10 shown in the first embodiment of the present invention (FIGS. 3-16), each support rail 252 has an insert area 306 at the first end 266 of the support rail 252 and an extension section 308 at the second end 268 of the support rail 252, as best shown in FIGS. 3, 5 and 7-13. The insert area 306 and extension section 308 are cooperatively sized configured such that the extension section 308 of a first apparatus 10b securely fits inside the insert area 306 of a second apparatus 10b (with the first 10a and second 10b apparatuses shown in FIGS. 22 and 23 with regard to the configuration of the second embodiment of FIGS. 17-24) and so on until the user has a sufficient number of apparatuses 10 connected in a row for the desired amount of storage containers 14. During installation, the user will install the first apparatus 10a, by securely attaching the support rail 252 thereof to the area supports 52 using one or more connecting mechanisms 58, such as bolts, screws or other connectors 60. After the first apparatus 10a is installed, the user merely has to slide the extension section 308 of second apparatus 10b into the insert area 306 of first apparatus 10a (or slide the insert area 306 of the second apparatus 10b over the extension section 308 of the first apparatus 10a) and then securely attach the second apparatus 10 to the area supports 52.

Figure 22:
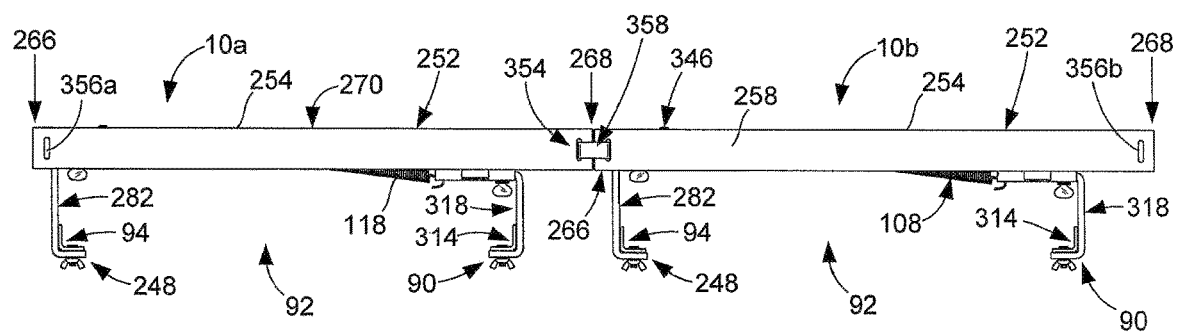
FIG. 22 is a side view of the container storage apparatus of FIG. 17 connected to a second container storage apparatus utilizing the connector bracket and joining mechanism of FIG. 21.
Figure 23:
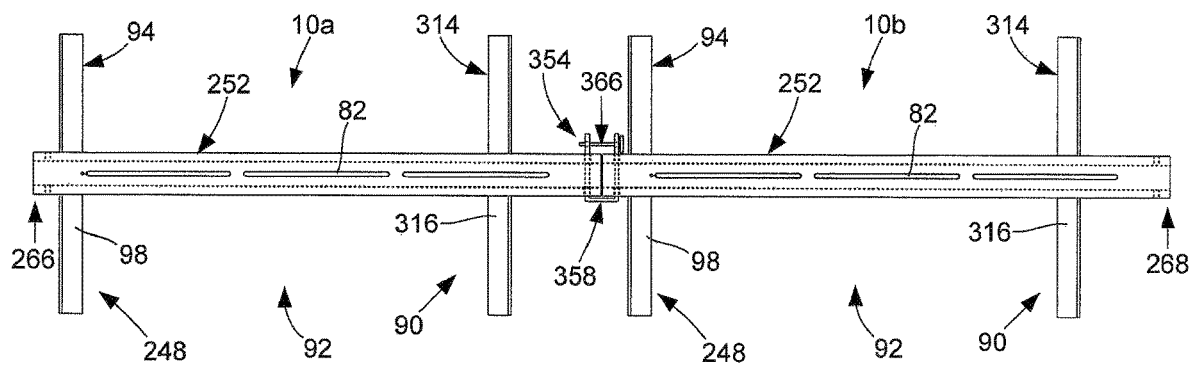
FIG. 23 is a top view of the connected container storage apparatuses of FIG. 22.

For the configuration of the apparatus 10 shown in FIGS. 17-27, a first apparatus 10a is connected to a second apparatus 10b utilizing a differently configured joining mechanism 354 (with the insert area 306 and extension section 308 comprising the above-described joining mechanism 354). In this configuration, the joining mechanism 354 for substantially end-to-end joining of a first apparatus 10a and a second apparatus 10b comprises one or more joining apertures 356 at each end 266/268 of the support rail 252 of the apparatuses 10a/10b and a joining member 358 that is cooperatively sized and configured with the joining apertures 356 to fit through the support rail 252 and join two apparatuses 10a/10b together. More specifically, each apparatus 10a/10b has one or more first joining apertures 356a at or generally near the first end 266 of the support rail 252 and one or more second joining apertures 356b at or generally near the second end 268 of the support rail 252, as best shown in FIGS. 17-18, 22 and 25. In the configurations shown in the figures, each of the first/left sidewall 256 and the second/right sidewall 258 have a first joining aperture 356a near the first end 266 thereof and a second joining aperture 356b near the second end 268 thereof. In one of the preferred configurations of the joining mechanism 354, best shown in FIG. 21, the joining member 358 is generally U-shaped with a pair of outwardly extending arms 360 and 362 that are sized and configured to fit through the joining apertures 356, with each arm 360/362 having an arm aperture 364 through which a securing member 366 is inserted to secure the joining member 358 to the two support rails 252 of the adjacent apparatuses 10a/10b, as shown in FIGS. 22 and 23. The securing member 366 can be a pin-shaped member having a relatively thin or narrow elongated section 368 that fits through the arm apertures 364 in the two arms 360 of the joining member 358 and an enlarged section 370 that prevents the securing member 366 from passing entirely through the arm apertures 364. The use and configuration of such securing devices, as well as generally similar or equivalent devices, are generally well known in the art. In the configuration shown in FIGS. 22 and 23, the joining member 358 is inserted through the joining apertures 356b at the second end 268 of the support rail 252 of a first apparatus 10a and the joining apertures 356b at the first end 266 of the support rail 252 of a second apparatus 10b to connect the two apparatuses 10a/10b in a generally linear or end-to-end manner.

As will be readily appreciated by persons who are skilled in the art, a wide variety of differently configured joining mechanisms 354 can be utilized to secure the support rail 252 of a first apparatus 10a to the support rail 252 of a second apparatus 10b in the linear manner described above or to otherwise connect two apparatuses 10a/10b together. As will also be readily appreciated by persons skilled in the art, two apparatuses 10a/10b can be placed in an end-to-end or linear configuration without utilizing any joining mechanism 254. One benefit of utilizing joining mechanism 354, however, is with regard to installing multiple apparatuses 10 of the present invention so the user can support multiple storage containers 14. Without the joining mechanism 354, the user has to position and hold each of the apparatuses 10 and use one or more connecting mechanisms 58 to secure each apparatus 10 to the area supports 52. With the joining mechanism 354, specially the joining mechanism 354 of the configuration shown in FIGS. 17-24, once the first apparatus 10a is secured in place, the second apparatus 10b is very easy to install. More particularly, once the user secures the first apparatus 10a to the area supports 52, all he or she has to do is to place the second apparatus 10b in an end-to-end position and then insert the arms 360/362 of the joining member 358 through the joining apertures 356 of the two adjacent support rails 252 to hold the second apparatus 10b in place while he or she uses a connecting mechanism 58 to secure the second apparatus 10b to the area supports 52. Preferably, the joining member 358 will be made out of materials and sized to be sufficiently strong enough to support the weight of the second apparatus 10b while it "hangs" from an end 266/268 of the support rail 252 of the first apparatus 10a in a hands-free manner. The user will be able to very easily install the connecting mechanism 58 to secure the second apparatus 10b in place.

A fourth embodiment of the apparatus 10 of the present invention is shown in FIGS. 28-45. In this embodiment, as with the embodiments set forth above and in the present Applicant's previous patent application (patent application Ser. No. 16/657,073, which issued as U.S. Pat. No. 10,271,651), the disclosure of which is fully incorporated herein as though the text and drawings thereof are set forth in the present disclosure, the apparatus 10 and system 12 of the present invention comprises container engaging section 48 and mounting section 50. The container engaging section 48 is structured and arranged to removably support a storage container 14 (or other object) and a mounting section 50 that is structured and arranged to mount the apparatus 10 to one or more area supports 52. The mounting section 50 comprises a single elongated support rail 252, which is used as the dynamic support rail, with apertures 82 to mount the apparatus 10 to the area supports 52. As will be readily appreciated by persons who are skilled in the relevant art, the apparatus 10 provides either a single location for hanging a storage container 14 or, when multiple apparatuses 10 are connected together, a single linear row of apparatuses 10 for hanging multiple storage containers 14 below the area supports 52.

As set forth in more detail below, the elongated support rail 252 of the apparatus 10 supports a static container support assembly 248 and a moveably disposed dynamic container support assembly 90, as best shown in FIGS. 28-34. When in use, the support rail 252 also supports a storage container 14 in the container space 92 that is defined between the static container support assembly 248 and the dynamic container support assembly 90, as shown in FIGS. 18 and 24 (with regard to the previous embodiments). The elongated support rail 252 has a plurality of walls, namely an upper wall 254, first/left sidewall 256 and second/right sidewall 258, that define an interior channel 260 through which portions of the dynamic support assembly 90 moves (namely, as set forth below, the moving mechanism 142) as the apparatus 10 moves between its first or biased position 262 (which is the empty or default position) and a second or container support position 264, as respectively shown with regard to the previous embodiment in FIGS. 17 and 18. The support rail 252 has a first or front end 266 at the front side 72 of the apparatus 10 and a second or back end 268 at the back side 74 of the apparatus 10, as best shown in FIGS. 28-30, 35 and 37. The support rail 252 is sized and configured to safely support the apparatus 10, container 14 and the items stored in the container 14 below the area supports 52 in the garage, shed, room, closet or other area and above the lower surface 250 where the apparatus 10 and system 12 will be utilized, as shown in FIG. 24. The support rail 252 of the apparatus 10 can be made out of metal, plastic, fiberglass, composites and other materials, the selection of which will generally affect the weight of the containers 14 (and their items) that can be supported by the apparatus 10.

To mount the support rail 252 to the area supports 52, the upper wall 256 of the support rail 252 has one or more apertures 82 therethrough that are utilized to securely position the upper surface 270 of the upper wall 256 in abutting engagement with, directly or indirectly, the area supports 52 or ceiling 56, as shown in FIG. 24. A connecting mechanism 58 is utilized through one or more of the apertures 82 to secure the support rail 252 to the area supports 52. As will be readily appreciated by persons skilled in the art, the support rail 252 will typically, but not exclusively, be mounted to the one or more area supports 52 using an appropriate connecting mechanism 58, such as one or more nails, screws, bolts or other connectors 60 (shown in FIG. 24) or by use of other appropriate connecting mechanisms 58, including welding and the like, depending on the materials utilized for support rail 252 of apparatus 10 and the area supports 52. In one embodiment of the present invention, the system 12 comprises an apparatus 10, a storage container 14, one or more area supports 52 (whether joists 54, ceiling 56, roof or any other structurally adequate members), and the lower surface 250, as shown in FIG. 24.

As set forth above, the support rail 252 is structured and arranged to support the dynamic container support assembly 90 as it moves toward and away from the stationary container support member 248. The apparatus 10 has a biasing mechanism 108 to pull the dynamic container support assembly 90 toward the static container support mechanism 248 in a manner that engages the lips 44/46 of the storage container 14 so as to securely support the storage container 14 in the container space 92 of apparatus 10, as shown in FIG. 24. As set forth above, to place the storage container 14 in the container space 92 of the apparatus 10 or to remove the storage container 14 from the apparatus 10, the user will press against the dynamic container support assembly 90 in the rearward direction (i.e., toward the back side 74 of the apparatus 10) to overcome the biasing mechanism 108 and push the dynamic container support assembly 90 away from the static container support assembly 248. As such, the support rail 252 is structured and arranged to moveably support the moving mechanism 142 as the dynamic support 100 moves toward and away from the stationary container support member 248 in response, respectively, to the biasing mechanism 108 placing the apparatus 10 in its biased position 262 or the user placing the apparatus 10 in its container storage position 264. The moving mechanism 142 is moveably engaged with and, in a typical configuration of apparatus 12, primarily disposed inside the interior channel 260 of the support rail 252, as best shown in FIGS. 28-30 and 32.

Figure 35:
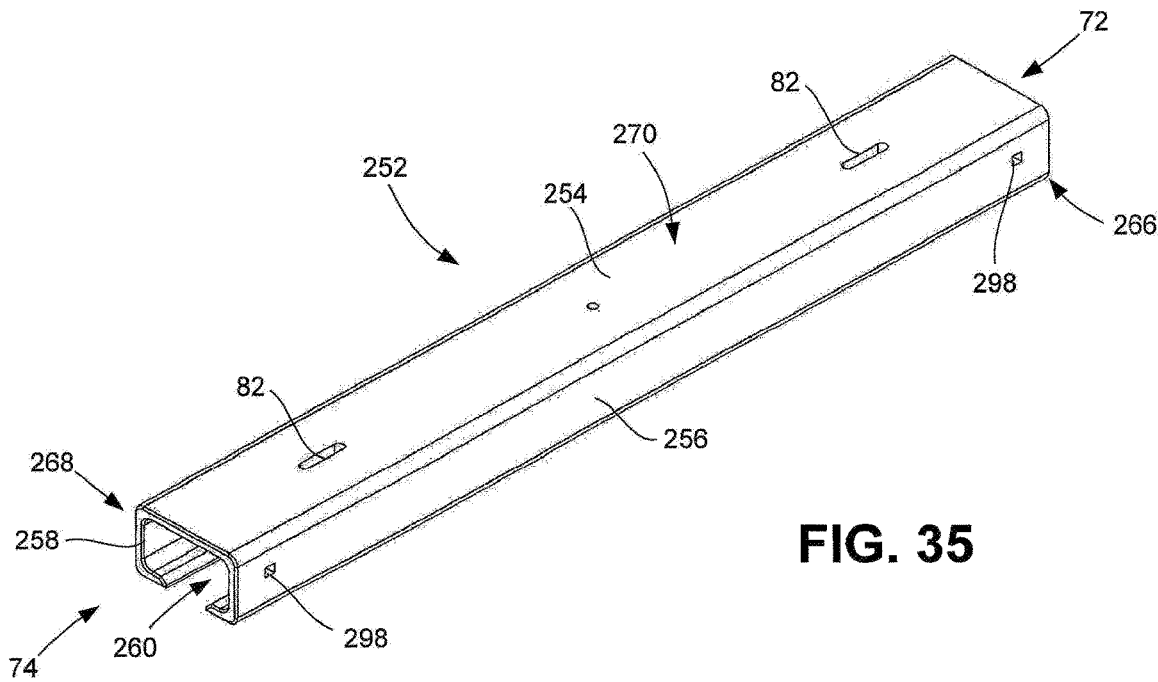
FIG. 35 is a top back perspective view of the support rail of the container storage apparatus of FIG. 28.
Figure 36:
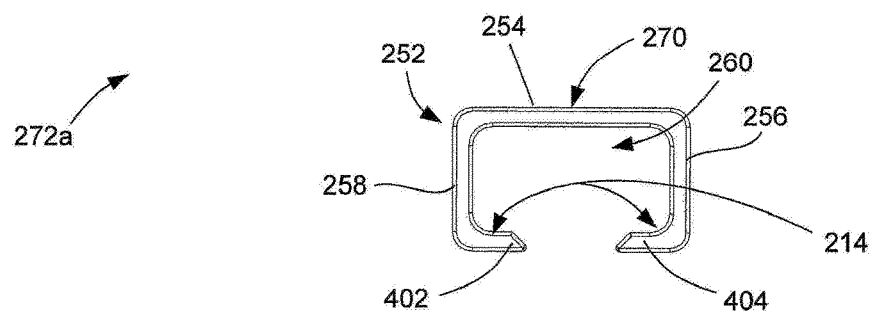
FIG. 36 is a back view of the support rail of FIG. 35.
Figure 37:
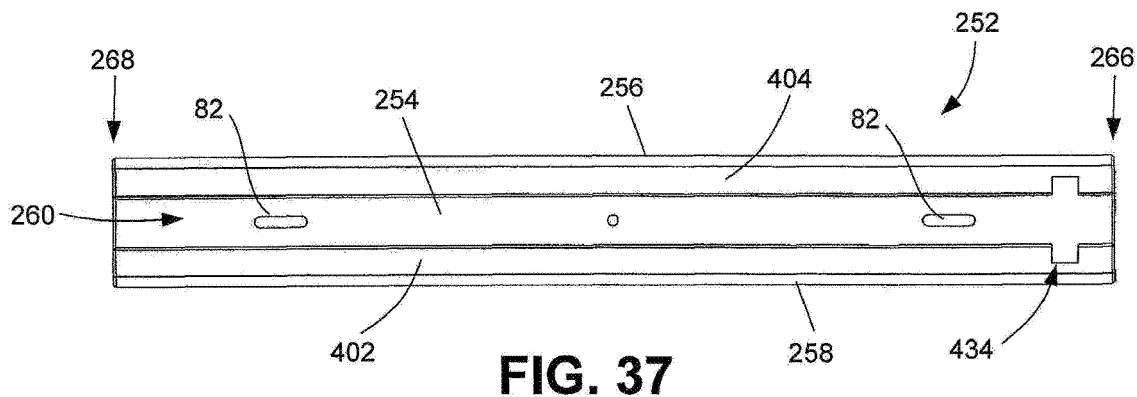
FIG. 37 is a bottom view of the support rail of FIG. 35.

As set forth in more detail below, the moving mechanism 142 of the fourth embodiment of the present invention comprises a track engaging member 372, best shown in FIGS. 40 and 43-45, that is sized and configured to slidably engage or otherwise move along a track 214, best shown in FIGS. 35-37, that is disposed inside the interior channel 260 defined by the walls 254/256/258 of the support rail 252. In certain configurations of apparatus 10, the moving mechanism 142 is sized and configured to entirely fit inside the interior channel 260 and move (whether roll, slide or the like) along the track 214 defined by the support rail 252. In the fourth embodiment shown, the track 214 is formed by a pair of inwardly disposed, generally planar sections, shown as 402 and 404 in FIGS. 36-37 (instead of the upturned sections 252a/252b), associated with each of the sidewalls 256/258 which the moving mechanism 142 will moveably engage as dynamic support 100 moves toward and away from the static container support assembly 248, as described in more detail below. As will be readily appreciated by persons who are skilled in the art, the track 214 associated with the support rail 252 can be configured in a wide variety of different manners as long as the track 214 and moving mechanism 142 are both cooperatively configured with each other to allow the moving mechanism 142 to move the dynamic support 100 toward and away from the static container support assembly 248

Figure 40:
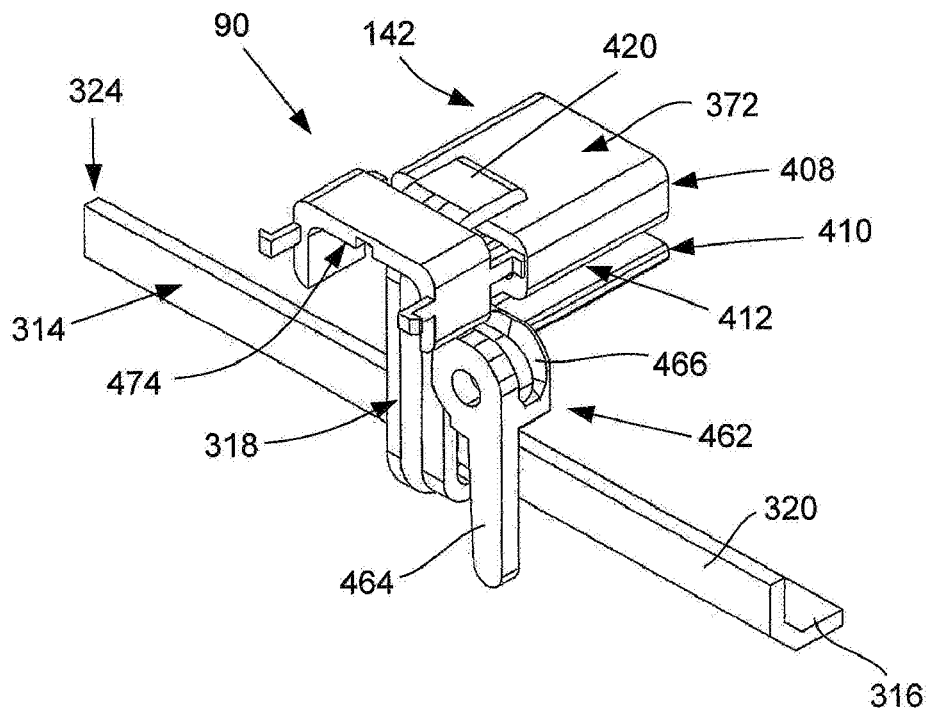
FIG. 40 is a back perspective view of the dynamic container support assembly, moving mechanism and locking mechanism of the container storage apparatus of FIG. 28.
Figure 47:
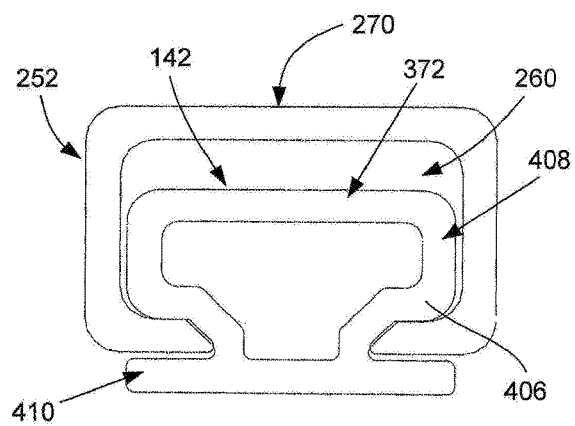
FIG. 47 is a front view of the shaped track engaging member of FIG. 46 shown positioned inside a support rail showing the engagement of the track engaging member with the support rail.

In the present embodiment, the moving mechanism 142 comprises a single, specially configured track engaging member 372 that is attached or integral with the dynamic container support assembly 90, as best shown in FIGS. 40 and 44-47. The track engaging member 372 comprises a member body 406 having an upper section 408, a lower section 410 and a pair of cut-out or grooved areas 412 therebetween, with grooved areas 412 being positioned at and extending along each side, shown as first side 414 and second side 416, of the track engaging member 372 between the upper section 408 and the lower section 410 thereof, as best shown in FIGS. 44-47. The grooved areas 412 are sized and shaped in corresponding relation with the generally planar, inwardly disposed sections 402 and 404 of the support rail 252 so the track engaging member 372 will slidably move along the support rail 252 with the grooved areas 412 sliding along the opposing inwardly disposed sections 402/404, as shown in FIG. 47. In use, as shown in FIG. 47, the upper section 408 of the track engaging member 372 will be inside the interior channel 260 of the support rail 252 with the lower section 410 extending below the support rail 252 (i.e., below the inwardly disposed sections 402 and 404). The materials selected for the track engaging member 372 should be chosen so as to be able to relatively easily slide along the inwardly disposed sections 402/404 of the support rail 252. As shown in FIG. 40, the track engaging member 372 of the present embodiment is attached to the dynamic container support assembly 90 by use of a connecting notch or aperture 418, shown in FIGS. 44-45, that is sized and configured to be engaged by, as set forth in more detail below, a block engaging clip 420 associated with the dynamic bracket 318. The track engaging member 372 of this embodiment also has a spring aperture 422 that is sized and configured to connect to the second end 348 of the spring 118 of the biasing mechanism 108 which is utilized to bias the dynamic container support assembly 90 towards the static container support assembly 248 to engage the storage container in the container space 92.

As set forth above the static container support assembly 248 is stationary, relative to the support rail 252, so as to provide a support that will engage one of the lips 44/46 of a container 14 and the dynamic container support assembly 90 moves inward and outward (i.e., toward the front side 72 or back side 74 of the apparatus 10, to or away from the static container support assembly 248), to engage the opposite facing lip 44/46 of the container 14 in order to securely, but easily removably, hold the container 14 in the apparatus 10, as shown in FIGS. 18 and 24. The amount of the movement that is required for the dynamic container support assembly 90 depends on the width W or, alternatively, length L of the container 14 that will be utilized with apparatus 10.

Figure 33:
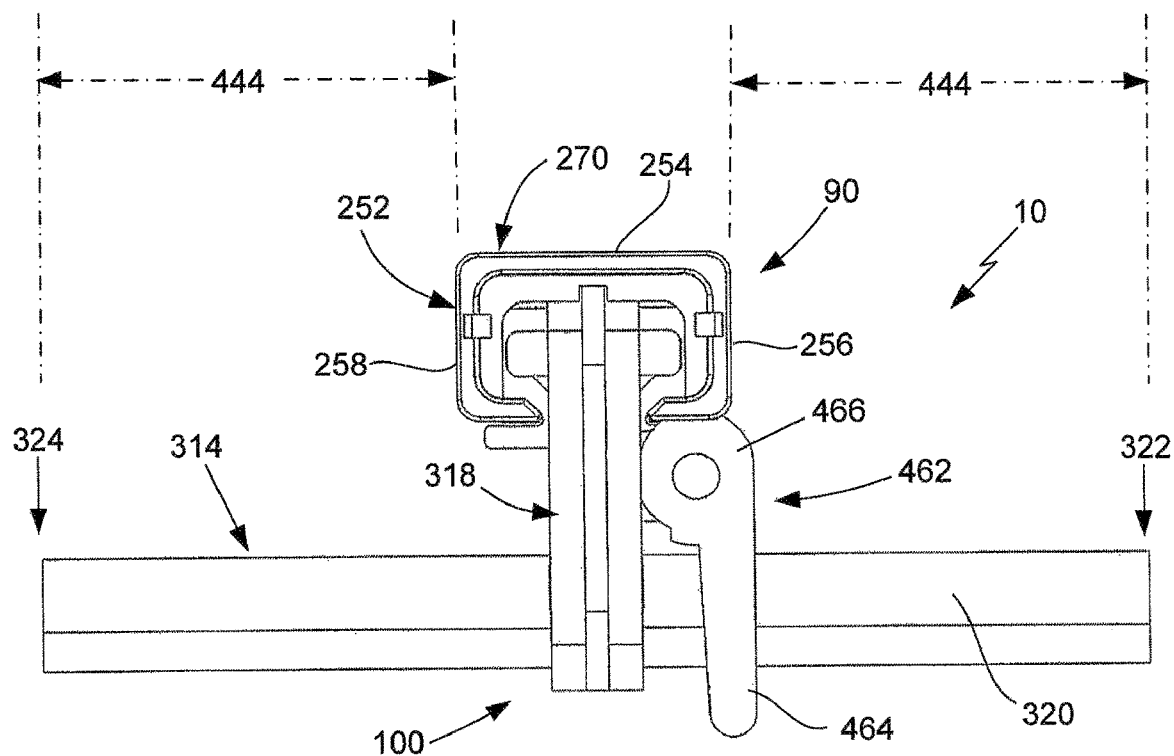
FIG. 33 is a back view of the container storage apparatus of FIG. 28.
Figure 34:
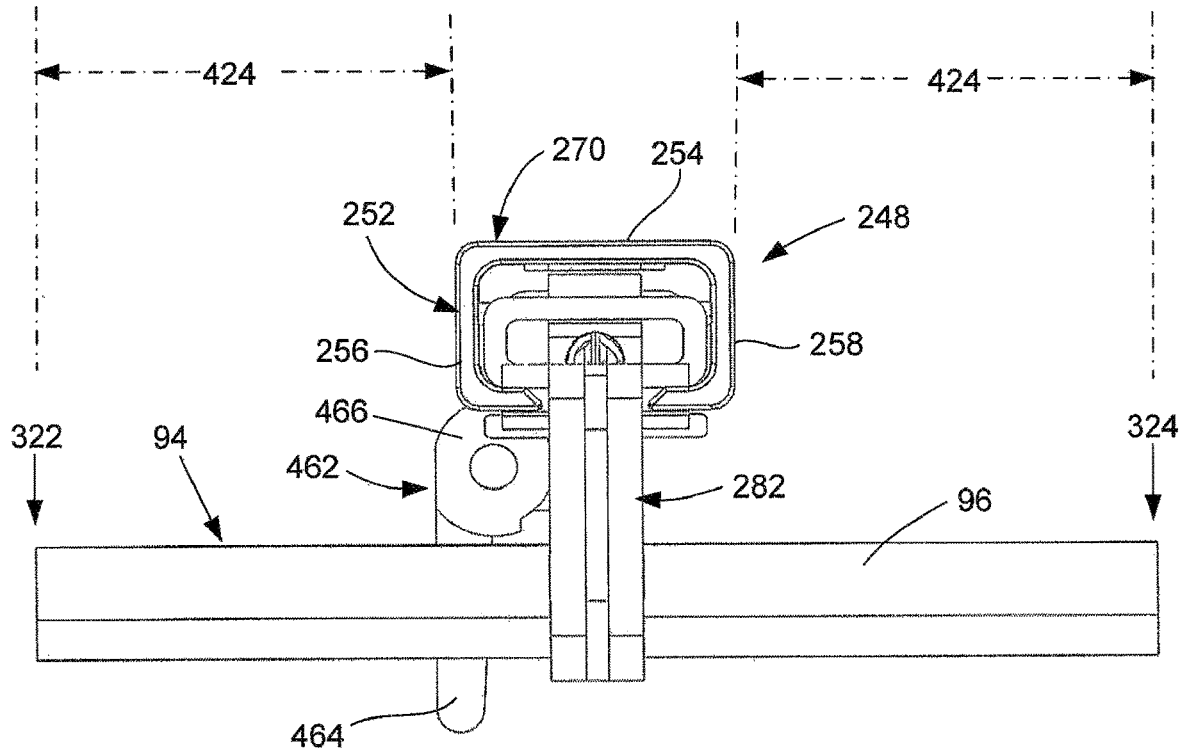
FIG. 34 is a front view of the container storage apparatus of FIG. 28.

In the present embodiment, as with the embodiments above, the static container support assembly 248 comprises an elongated L-shaped static support member 94 having a first and left end 278 at the first/left side 76 of the apparatus 10 and a second or right end 280 at the second/right side 78 of the apparatus 10, as best shown in FIGS. 28-34. The static support member 94 has a vertical member 96 and a horizontally disposed lip engaging member 98, best shown in FIGS. 38-39. For use with a "tote" type storage container 14, the static support member 94 is perpendicular to the support rail 252, as best shown in FIGS. 28 and 31-34. The lip engaging member 98 attaches to, directly or indirectly, the support rail 252, typically at or near one end 266/268 of the support rail 252 (such as the first end 266 shown in FIGS. 28-30). As with the embodiments above, the lip engaging member 98 is sized and configured to engage one of the lips 44/46 of the container 14, as shown in FIGS. 18 and 24. In one embodiment, the lip engaging member 98 is substantially horizontal so as to extend inwardly into the container space 92 so a lip, such as first lip 44 as shown in FIGS. 18 and 24, of the container 14 will be positioned on top of or otherwise supported by the lip engaging member 98 when the container 14 is being pressed against the static container support assembly 248 by the dynamic container support assembly 90. In the present embodiment, the static support member 94 has a length (i.e., from first end 278 to its second end 280) that will be sufficient to safely support the desired containers 14. As shown in the figures, a portion of the static support member 94 extends beyond the sidewalls 256/258 of the support rail 252 to safely and effectively support the storage container 14 in the container space 92. More specifically, the static support member 94 has an outwardly extending area 424 that extends outward beyond the sidewalls 256/258 of the support rail 252, as shown in FIG. 34. The length of the static support member 94 represented by the outwardly extending areas 424 is necessary, and important, to be able to fully and safely support a storage container 14, and any items therein, at the lips 44/46 associated with the sidewalls 256/258. As with most components of the apparatus 10, the static support member 94 can be made out of a wide variety of materials, with the various components thereof being attached or integral to each other and attached to or integral with support rail 252 of mounting section 50.

In the embodiments shown in the figures, the static container support assembly 248 of apparatus 10 also comprises a static bracket 282 that connects the static support member 94 to the support rail 252, as best shown in FIGS.

Figure 38:
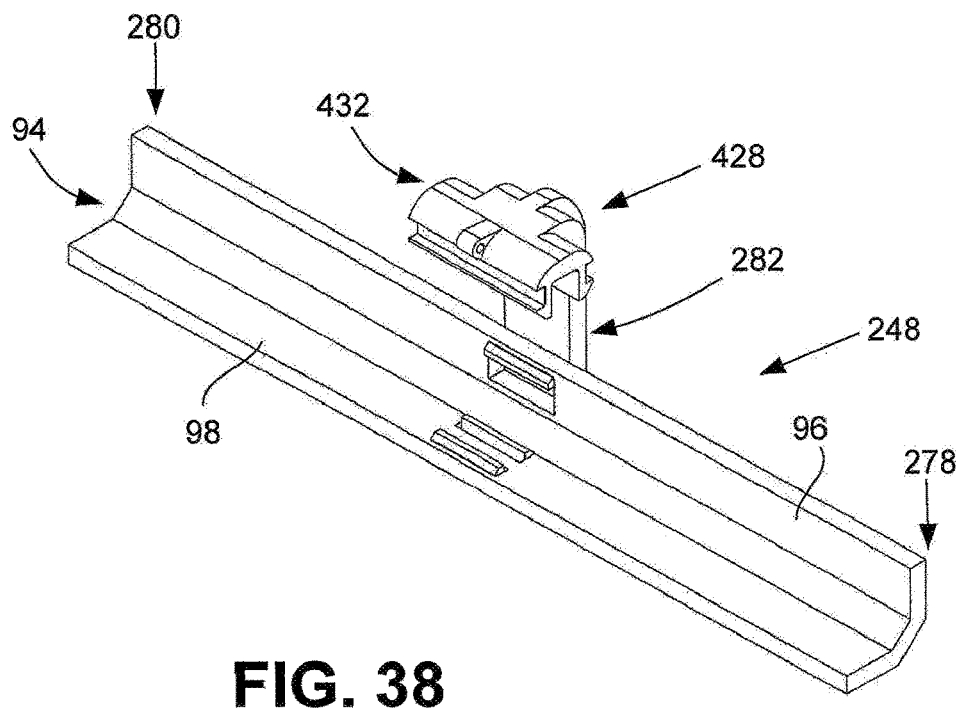
FIG. 38 is a back perspective view of the static container support assembly of the container storage apparatus of FIG. 28.
Figure 39:
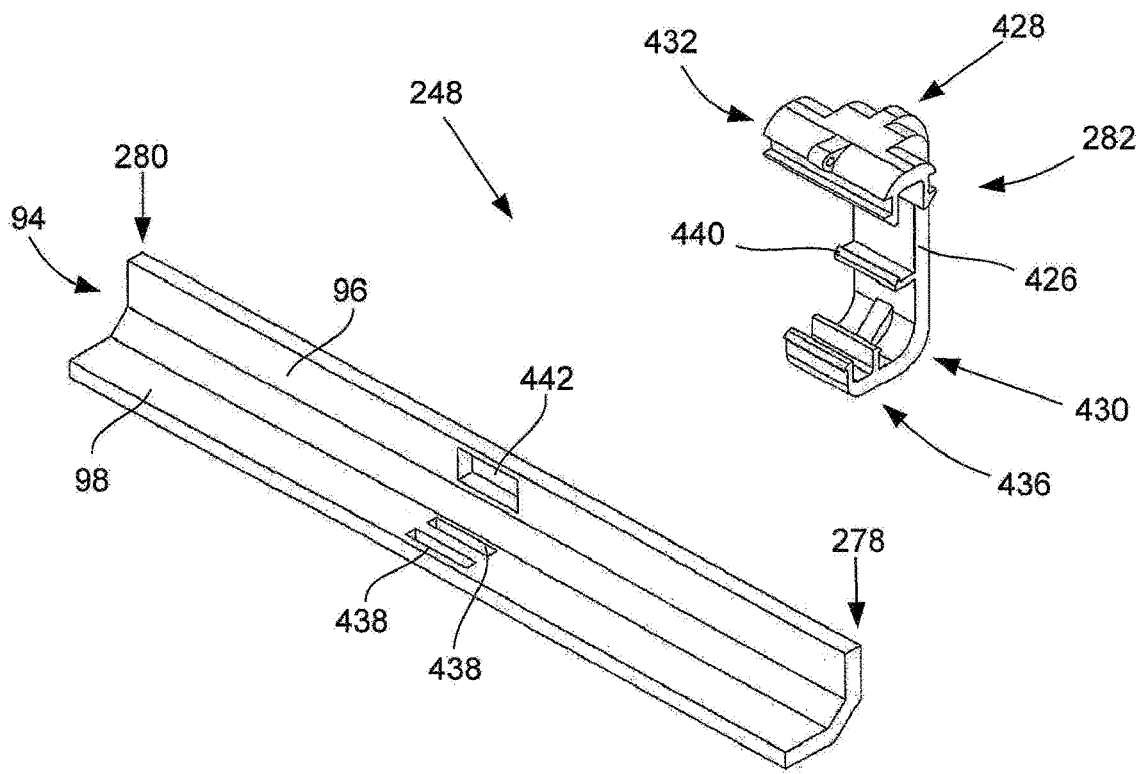
FIG. 39 is an exploded view of the static container support assembly of FIG. 38.

28-30 and 34. The static bracket 282 of the present embodiment is configured as a clip having a clip body 426 with an upper end 428 that connects to the support rail 252 and a lower end 430 that connects to the static support member 94, as best shown in FIGS. 38-39. In the embodiment shown in these figures, the static bracket 282 comprises an upper connecting clip 432 at the upper end 428 of the clip body 426 that attaches to a cut-out 434 in the support rail 252, shown in FIG. 37, and a lower connecting clip 436 that attaches to cooperatively configured clip apertures 438 in the lip engaging member 98 of the static support member 94 in a manner which securely attaches the static support member 94 to the support rail 252, as shown in FIGS. 28-30, 32 and 34. In the embodiment shown in the figures, the upper connecting clip 432 has downwardly extending prongs (or other clip members) that are cooperatively sized and configured securely engage the cut-out 434 in the support rail 252 and the lower connecting clip 436 has upwardly extending prongs (or other clip members) that are cooperatively sized and configured to securely engage the clip apertures 438 in the static support member 94. The static bracket 282 also has an inwardly extending clip member 440 that is sized and configured to securely engage a clip aperture 442 in the vertical member 96 of the static support member 94 to provide additional support and stability for the apparatus 10. As will be readily appreciated by persons skilled in the art, one of the advantages of having a static bracket 282 configured as a clip, with clip body 426 and the upper 432 and lower 436 connecting clips is that the static container support assembly 248 can be put together and connected to the support rail 252 without the need of screws, bolts, rivets or other connectors and without the need for any welding, adhesives or the like. This configuration may be particularly beneficial with the components of the apparatus 10 being made out of plastic or the like.

As set forth above, the dynamic container support assembly 90 is structured and arranged to move inward and outward relative to the container space 92 to, respectively, either engage and hold the container 14, by one of the lips 44/46 thereof (as shown in FIGS. 18 and 24), in the container space 92 or for removal of the container 14 from the apparatus 10 and/or placement of a wider or longer container 14 in the container space 92. The dynamic container support assembly 90 comprises a dynamic support 100 that is structured and arranged to removably engage and secure the container 14 in apparatus 10. The dynamic support 100 has an elongated dynamic support member 314, which in the preferred embodiments is perpendicular to the support rail 252, with a lip engaging member 316 attached thereto or integral therewith that is sized and configured to engage one of the lips 44/46 of storage container 14, a moving mechanism 142 that allows the dynamic support member 314 to move relative to the support rail 252 and a biasing mechanism 108 that bias the dynamic support member 314, with its lip engaging member 316, into the container space 92 and against the storage container 14 when the apparatus 10 is being utilized to hold the storage container 14, as shown in FIGS. 18 and 24. As with the other components of the apparatus 10, the dynamic support 100 of the present embodiment can be made out of metal, plastic, fiberglass, composites or other materials that, among other factors, are selected to be appropriate for the weight of the containers 14 and the items that are stored therein.

Figure 41:
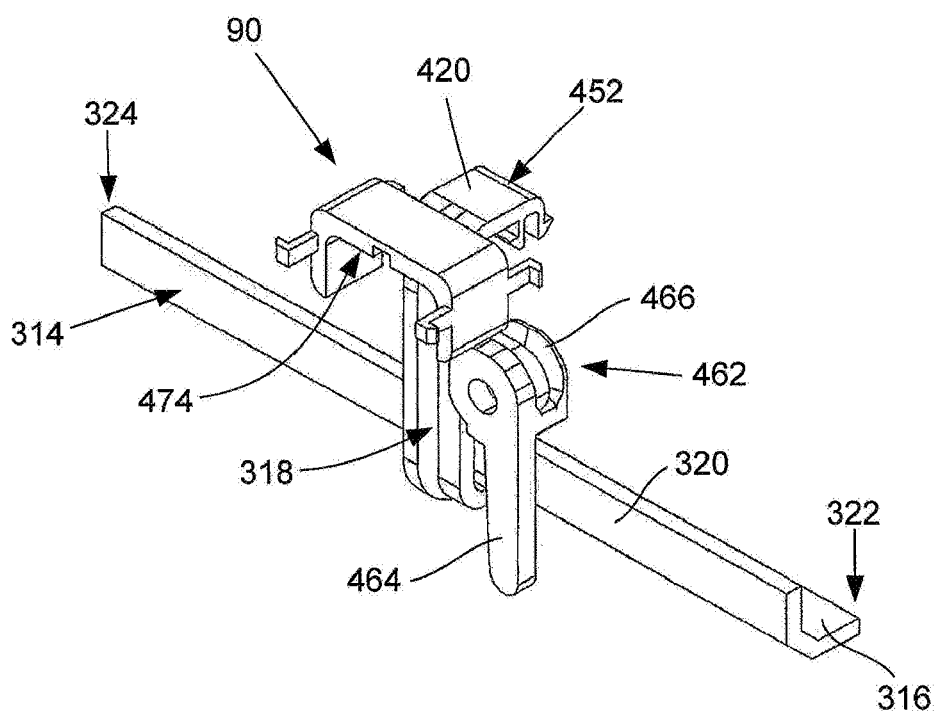
FIG. 41 is a back perspective view of the dynamic container support assembly and locking mechanism of FIG. 40.

The dynamic support 100 also has a dynamic bracket 318 that interconnects the dynamic support member 314 and the moving mechanism 142 so the lip engaging member 316 will move inward and outward with the movement of the moving mechanism 142, which moves inward in response to the biasing mechanism 108 or outward in response to the user overcoming the biasing force of the biasing mechanism 108. The dynamic bracket 318 is connected to or integral with both the dynamic support member 314, having lip engaging member 316, and the moving mechanism 142, as best shown in FIG. 41. In one configuration, the dynamic support member 314 is an L-shaped member having the lip engaging member 316 as the horizontal portion and a vertical member 320 as the vertical portion, as best shown in FIGS. 28, 33 and 40-42. The dynamic support member 314 has a first or left end 322 at the first/left side 76 of the apparatus 10 and a second or right end 324 at a second/right side 78 of the apparatus 10, as shown in FIGS. 5-6. Lip engaging member 316 is sized and configured to engage one of the lips 44/46 of container 14, as shown in FIGS. 18 and 24. In one configuration, lip engaging member 316 is substantially horizontal so as to extend inwardly into the container space 92 to engage a lip, such as second lip 46 as shown in FIGS. 18 and 24, will be positioned on the lip engaging member 316 when the container 14 is being pressed against the static container support assembly 248 by the dynamic container support assembly 90. As will be readily appreciated by persons skilled in the relevant art, the lip engaging member 316 can be of a wide variety of different sizes and configurations.

In the present embodiment, the dynamic support member 314 has a length (i.e., from its first end 322 to its second end 324) that will be sufficient to safely support the desired containers 14. As with the static support member 94, a portion of the dynamic support member 314 extends beyond the sidewalls 256/258 of the support rail 252 to safely and effectively support the storage container 14 in the container space 92. More specifically, the dynamic support member 314 has an outwardly extending area 444 that extends outward beyond the sidewalls 256/258 of the support rail 252, as shown in FIG. 33. The length of the dynamic support member 314 that is represented by the outwardly extending areas 444 is necessary, and important, to be able to fully and safely support a storage container 14, and any items therein, at the lips 44/46 associated with the sidewalls 256/258. As with most components of the apparatus 10, the dynamic support member 314 can be made out of a wide variety of materials, with the various components thereof being attached or integral to each other and attached to or integral with support rail 252 of mounting section 50.

Figure 43:
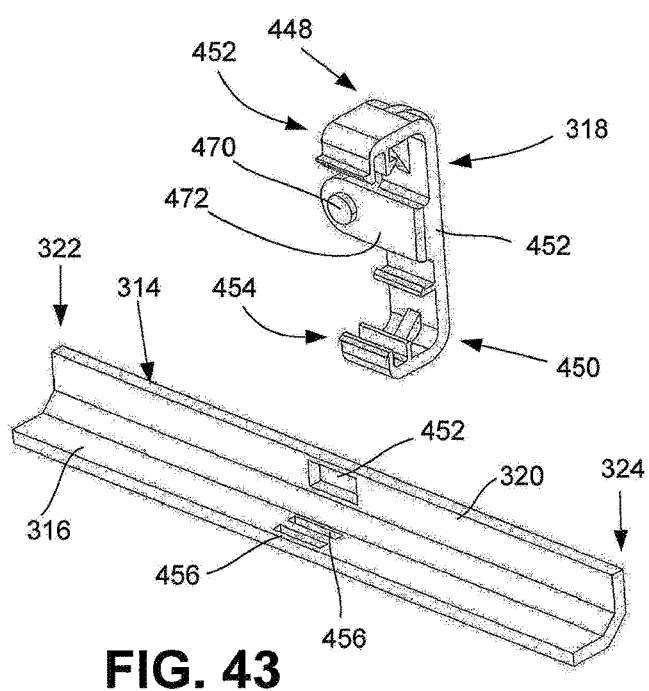
FIG. 43 is an exploded front perspective view of the dynamic container support assembly of FIG. 42.
Figure 44:
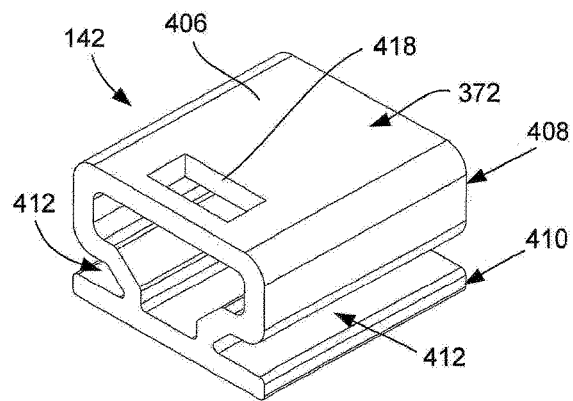
FIG. 44 is a back perspective view of the moving mechanism of the container storage apparatus of FIG. 28, with the moving mechanism shown as a shaped track engaging member.
Figure 45:
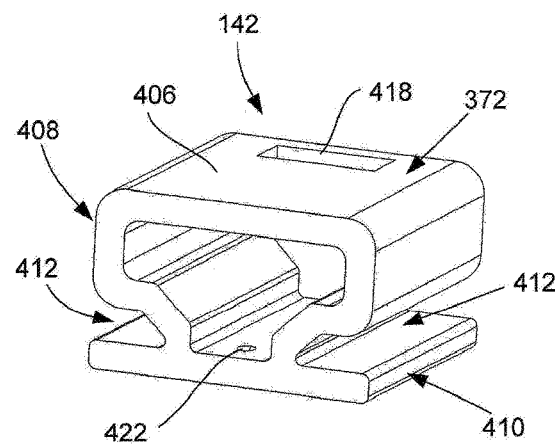
FIG. 45 is a front perspective view of the shaped track engaging member of FIG. 44.
Figure 46:
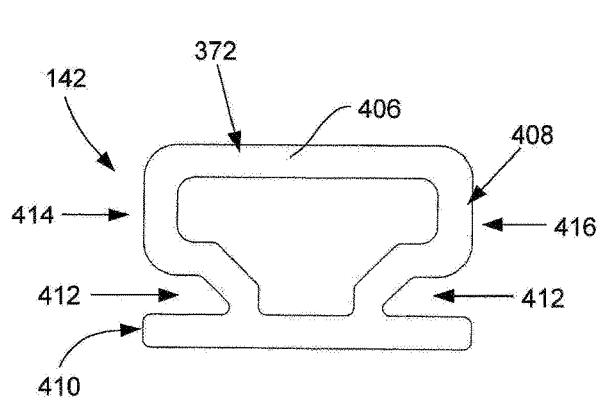
FIG. 46 is a front view of the shaped track engaging member of FIG. 45.

In the embodiments shown in the figures, the dynamic container support assembly 90 of apparatus 10 also comprises a dynamic bracket 318 that connects the dynamic support member 314 to the support rail 252, as best shown in FIGS. 28-30 and 33. The dynamic bracket 318 of the present embodiment is configured as a clip having a clip body 446 with an upper end 448 that connects to the support rail 252 and a lower end 450 that connects to the dynamic support member 314, as best shown in FIGS. 40-41. In the embodiment shown in these figures, the dynamic bracket 318 comprises an upper connecting clip 452 at the upper end 448 of the clip body 446 that attaches to the connecting aperture 418 in the member body 406 of the track engaging member 372, as best shown in FIGS. 40 and 43-44 (which is slidably engaged with the support rail 252) and a lower connecting clip 454 that attaches to cooperatively configured clip apertures 456 in the lip engaging member 316 of the dynamic support member 314 in a manner which securely attaches the dynamic support member 314 to the support rail 252, as shown in FIGS. 28-30, 32 and 33. The upper connecting clip 452 defines the block engaging clip 420 shown in FIG. 40 that connects the dynamic bracket 318 to the track engaging member 372. In the embodiment shown in the figures, the upper connecting clip 452 has downwardly extending prongs (or other clip members) that are cooperatively sized and configured securely engage the connecting aperture 418 in the track engaging member 372 and the lower connecting clip 454 has upwardly extending prongs (or other clip members) that are cooperatively sized and configured to securely engage the clip apertures 456 in the lip engaging member 316 of the dynamic support member 314. The dynamic bracket 318 also has an inwardly extending clip member 458 that is sized and configured to securely engage a clip aperture 460 in the vertical member 320 of the dynamic support member 314 to provide additional support and stability for the apparatus 10. As will be readily appreciated by persons skilled in the art, one of the advantages of having a dynamic bracket 318 configured as a clip, with clip body 446 and the upper 452 and lower 454 connecting clips is that the dynamic container support assembly 90 can be put together and connected to the support rail 252 without the need of screws, bolts, rivets or other connectors and without the need for any welding, adhesives or the like. This configuration may be particularly beneficial with the components of the apparatus 10 being made out of plastic or the like.

Figure 48:
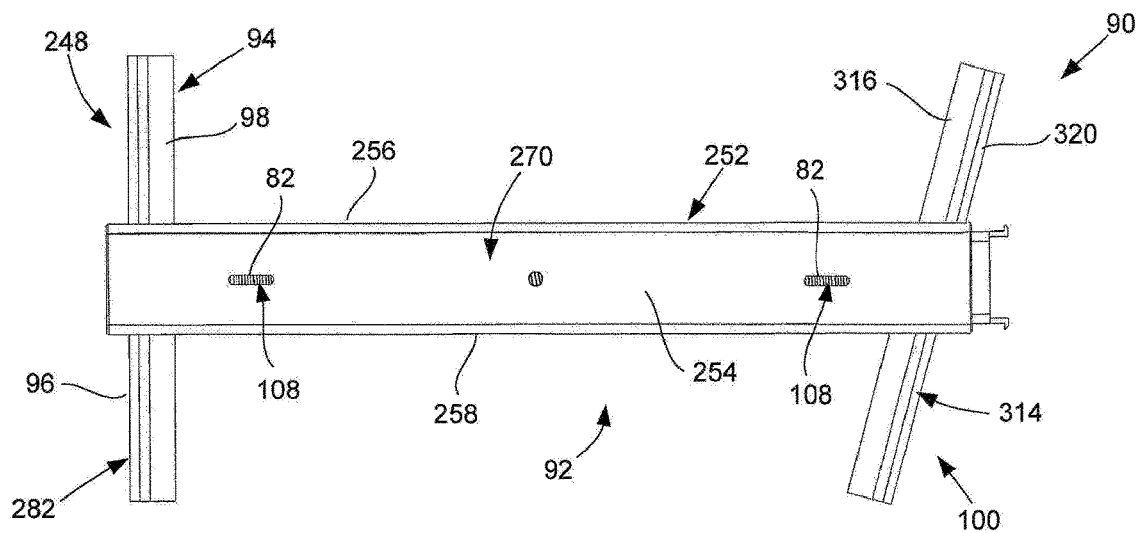
FIG. 48 is a top view of an alternative configuration of the container storage apparatus of FIG. 31 showing use of a dynamic container support assembly having an angularly disposed dynamic support member.

In one of the preferred embodiments of the present invention, the dynamic container support assembly 90 and the static container support assembly 248 are mirror configurations of each other, as shown in FIGS. 28-34. More specifically, both the dynamic support member 314 and the static support member 94 are both L-shaped with the lip engaging member 316 of the dynamic support member 314 facing inward toward the lip engaging member 98 of the static support member 94, as best shown in FIGS. 28-32. Also, as noted above, both of the static support member 94 and the dynamic support member 314 are perpendicular to the support rail 252 with the outwardly extending areas 424/444 extending beyond the sidewalls 256/258 of the support rail 252. In other embodiments, as described below, the static support member 94 and the dynamic support member 314 are not mirror images of each other and/or are not perpendicular to the support rail 252. For instance, FIG. 48 illustrates the dynamic support member 314 at an angle relative to the perpendicularly disposed static support member 94. Such a configuration would be useful for objects 400 that do not have parallel sidewalls or other components which are engaged by the static support member 94 and dynamic support member 314. Such a configuration is useful for storing a bicycle, having non-parallel frame members, in the apparatus 10 of the present invention. In one embodiment, the static support member 94 and/or the dynamic support member 314 may pivotally disposed relative to the support rail 252 to allow the user to selectively adjust the angle of the static support member 94 and/or the dynamic support member 314 relative to the support rail 252 to correspond to the sidewalls, frame members or other components of the object 400 that will be stored in the apparatus 10. As will be readily appreciated by persons who are skilled in the art, there are a wide variety of different types of pivoting mechanisms that can be utilized with the apparatus 10 to allow the user to pivot the static support member 94 and/or the dynamic support member 314 relative to the support rail 252. The configuration and use of such mechanisms are generally well know to such persons.

Figure 42:
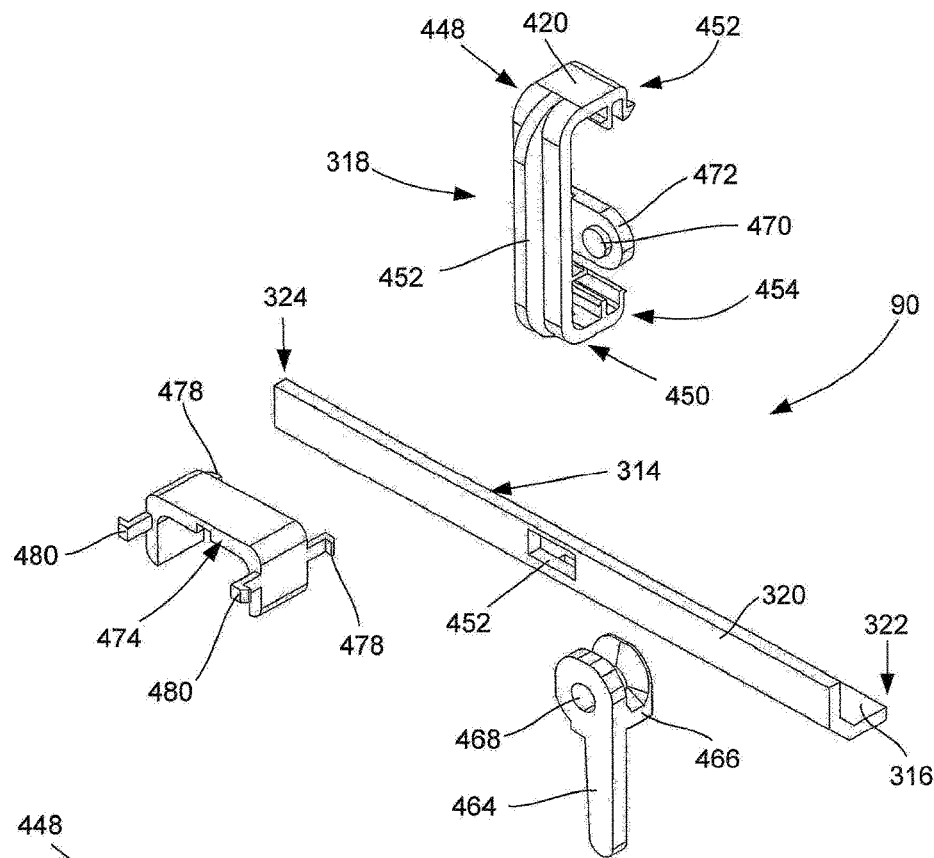
FIG. 42 is an exploded back perspective view of the dynamic container support assembly and locking mechanism of FIG. 41.

The embodiment of the apparatus 10 illustrated in FIGS. 28-34 shows use of a locking mechanism 462 that is structured and arranged to allow or prevent movement of the dynamic container support assembly 90 relative to the support rail 252 (a locking system is disclosed in Applicant's previous patent application Ser. No. 16/657,073, which issued as U.S. Pat. No. 10,271,651). The locking mechanism 462 is configured to be disengaged by the user to allow the dynamic container support assembly 90 to be moved away from the static container support assembly 248, by overcoming the biasing force from the biasing mechanism 108, so he or she may place a storage container 14 or other object 400 in the container space 92 or to remove a storage container 14 or object 400 from the container space 92 and then to be engaged by the user to lock the position of the dynamic container support assembly 90 on the support rail 252 to securely hold the storage container 14 or object 400 in the container space 92 and prevent any inadvertent movement of the dynamic container support assembly 90. In the embodiment shown in the figures, the locking mechanism 462 comprises a lever 464, having an enlarged engagement section 466, that is pivotally attached to the dynamic bracket 318 so as to place the engagement section 466 in frictional engagement with the support rail 252, or other stationary component of apparatus 10, to prevent movement of the dynamic container support assembly 90 relative to the support rail 252, as shown in FIGS. 33-34 and 40-43. To allow the locking mechanism 462 to pivot, the engagement section 466 of the lever 464 has a pin aperture 468 that is sized and configured to receive a pin 470 positioned on a pin mounting member 472, as best shown in FIG. 42-43, in a manner which connects the locking mechanism 462 to the dynamic container support assembly 90 while allowing the lever 464 to pivot between a disengaged position and an engaged position to, respectively, allow or prevent movement of the dynamic container support assembly 90 on the support rail 252. In the configuration shown in the figures, the engagement section 466 of the lever 464 snaps onto the pin mounting member 472, at pin aperture 468 and pin 470, to define the locking mechanism 462. In use, the user moves the lever 464 upward or downward to engage or disengage the locking mechanism 462. The engagement section 446 of the lever 464 is sized and configured to frictionally engage a stationary component of the apparatus 10, such as the support rail 252, when the locking mechanism 462 is in its engaged or locked position and to not be in contact with the stationary component when the locking mechanism 462 is in its disengaged or unlocked position. As will be readily appreciated by persons who are skilled in the relevant art, there are a wide variety of different types of locking mechanisms and devices that can be utilized with the apparatus 10 as the locking mechanism 462 to allow the user to allow or prevent movement of the dynamic container support assembly 90 relative to the support rail 252. The configuration and use of such mechanisms are generally well know to such persons.

The present embodiment also has a modified joining mechanism 354 that is utilized to connect one apparatus 10 of the present invention to another apparatus 10 of the present invention in an end-to-end manner, as shown with regard to apparatuses 10a/10b shown in FIGS. 22-23. The joining mechanism 354 of the present embodiment is shown mounted to the support rail 252 in FIGS. 28-32 and adjacent the dynamic container support assembly 90 in FIGS. 40-41. The joining mechanism 354 comprises a joining clip 474 having a clip body 476 with a pair or inwardly extending prongs 478 and a pair of outwardly extending prongs 480, as best shown in FIG. 42. The inwardly extending prongs 478 and outwardly extending prongs 480 are both sized and configured to extend into the interior channel 260 of a support rail 252 to lockingly engage the apertures 298 in the sidewalls 256/258 of that support rail 252. When used to join apparatuses 10, the inwardly extending prongs 478 of a joining clip 474 engage the apertures 298 in the sidewalls 256/258 of a support rail 252 of one apparatus 10 (such as shown with regard to the second apparatus 10*b* in FIGS. 22-23) and the outwardly extending prongs 480 of the same joining clip 474 engage the apertures 298 in the sidewalls 256/258 of the support rail 252 of another apparatus 10 (such as shown with regard to the first apparatus 10*a* in FIGS. 22-23). In FIGS. 28-32, a joining clip 474 is shown with the inwardly extending prongs 478 of a joining clip 474 extending into the interior chamber 260 of the support rail 252 and being engaged with apertures 298 near the second end 268 of the support rail 252 so as to dispose the outwardly extending prongs 480 outward from the second end 268 so they can be utilized to engage the apertures 298 in the support rail 252 of another apparatus 10. As will be readily appreciated by persons who are skilled in the relevant art, there are a wide variety of different configurations for the joining clips 474 that can be utilized with the apparatus 10 as the joining mechanism 354 to allow the user to join two apparatuses 10 together in an end-to-end manner to provide linear arrangement of two or more apparatuses 10. The configuration and use of such mechanisms are generally well know to such persons.

Figure 49:
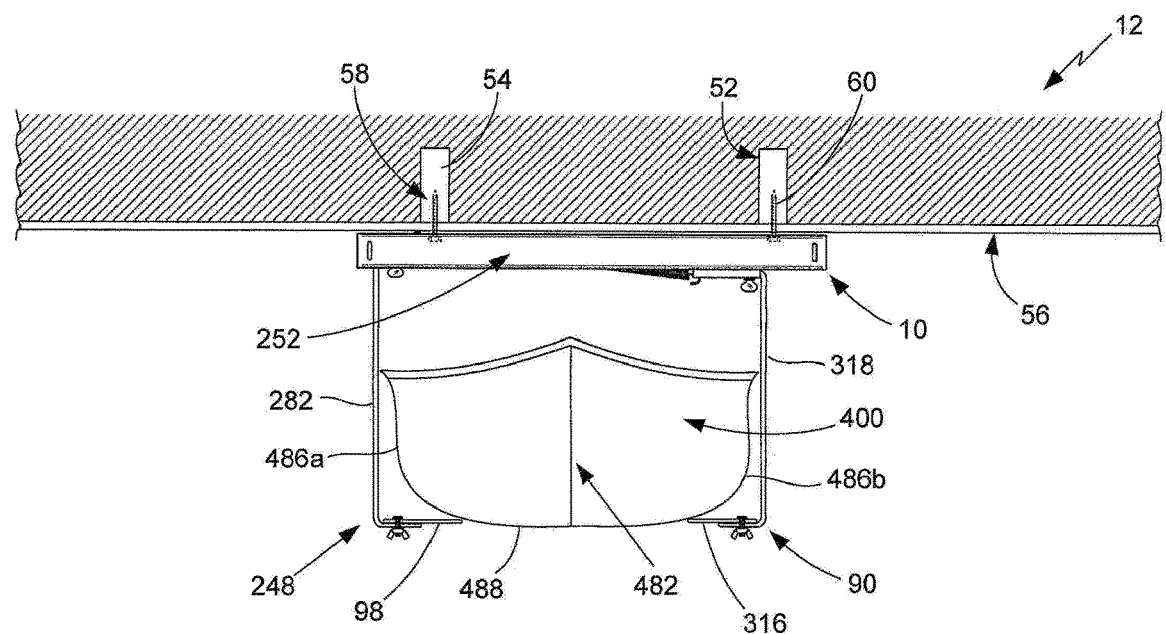
FIG. 49 is a side view of a container storage apparatus of the present invention shown supporting a canoe below a support surface, with the apparatus shown near the front end of the canoe.
Figure 50:
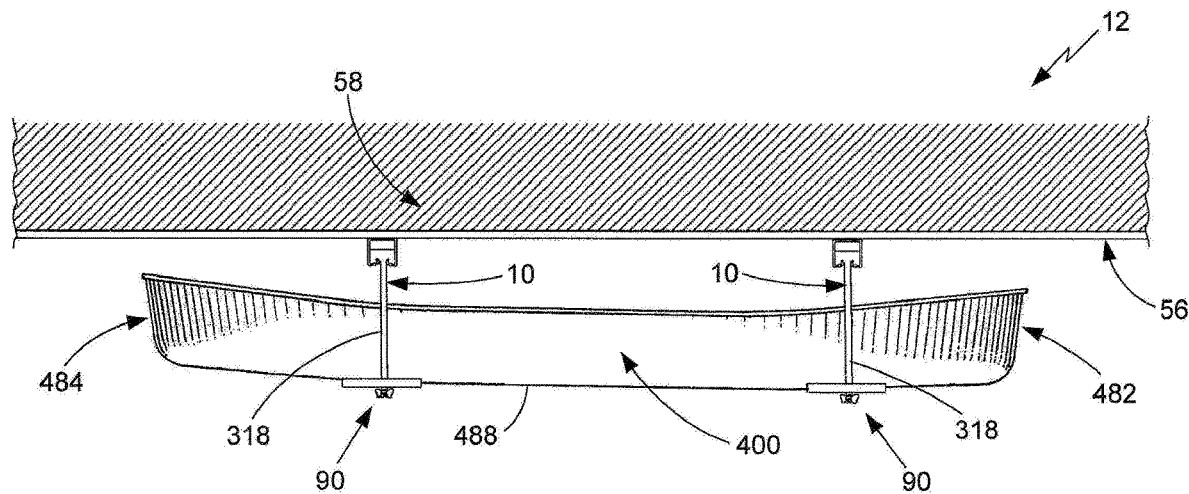
FIG. 50 is an end view of two apparatuses supporting a canoe, which is shown as a side view thereof.

The apparatus 10 and system 12 of the present invention can be easily adapted to hold a wide variety of objects 400, in addition to the storage containers 14 described above. For instance, the apparatus 10 and system 12 can be utilized to hold large items such as the canoe 400*a* shown in FIGS. 49 and 50, which has a first or front end 482, a second or back end 484, one or more sidewalls 486 (such as opposing sidewalls 486*a* and 486*b* in FIG. 50), and a bottom wall 488. With regard to the canoe 400*a*, which is also applicable to similar objects 400 such as kayaks and the like, the canoe 400*a* is held up near the ceiling 56 or other area supports 52 by a pair of apparatuses 10 that are spaced apart such that one apparatus 10 is positioned toward the first/front end 482 and one apparatus 10 is positioned toward the second/back end 484 of the canoe 400*a*. In this configuration, both the dynamic bracket 318 and the static bracket 282 are significantly longer, as shown in FIGS. 49-50, than those shown in the previous configurations to extend below the bottom wall 488 of the canoe 400*a*. Likewise, the lip engaging member 316 and lip engaging member 98 are both longer, as shown in FIG. 49, so as to extend inward towards each other a sufficient amount to accommodate the size and shape of the sidewalls 486 of the canoe 400*a*. In one embodiment, the length of the dynamic 318 and static 282 brackets and the lip engaging members 316/98 are adjustable by having, in one configuration, having telescoping components. In another embodiment, the user can replace these components as desired or necessary to accommodate the size and configuration of the object 400 to be supported by the apparatuses 10.

Figure 51:
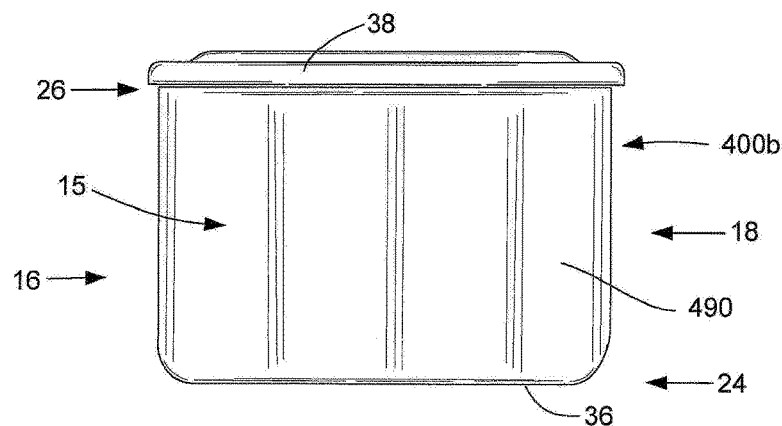
FIG. 51 is a side view of a prior art storage container that has a round or oval cross section.
Figure 52:
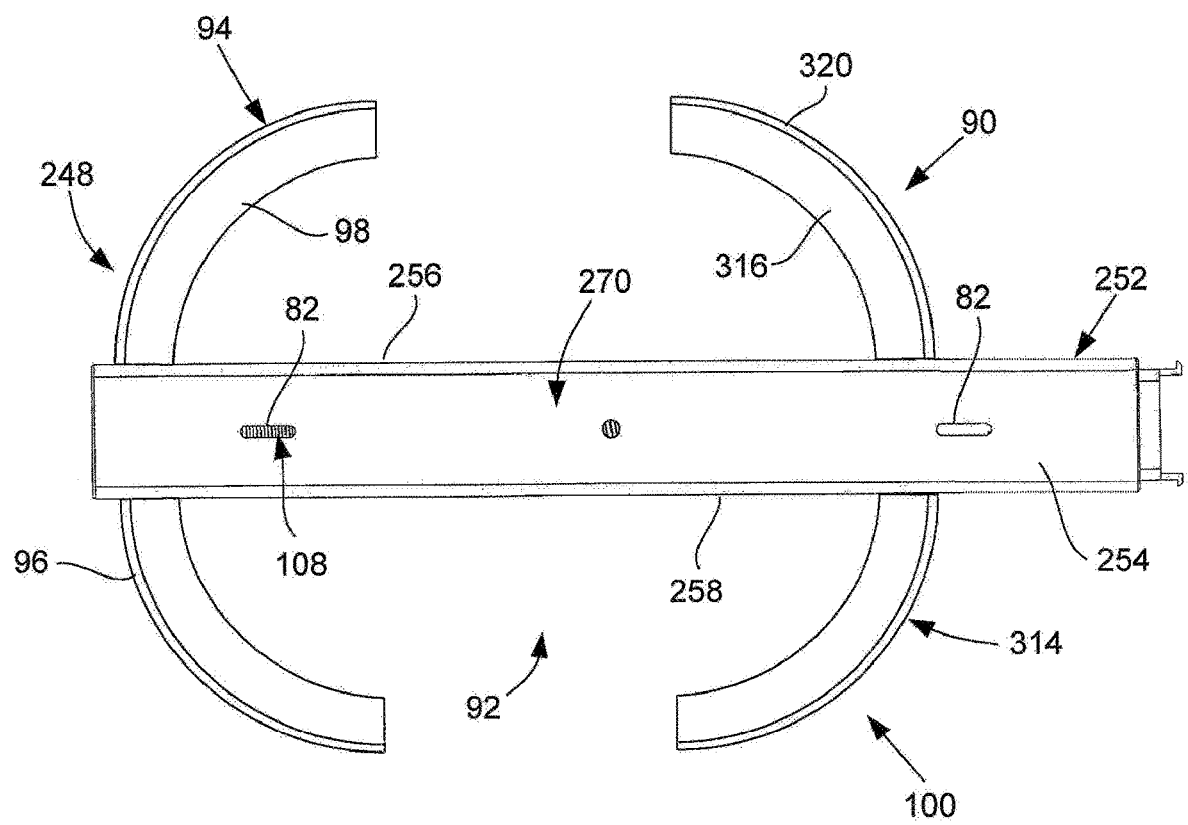
FIG. 52 is a top view of a container storage apparatus having a curved shaped static support member 94 and dynamic support member 314 to better support the round/oval storage container of FIG. 51.

In various embodiments of the apparatus 10 of the present invention, the static support member 94 of the static container support assembly 248 and the dynamic support member 314 of the dynamic container support assembly 90 can be configured in corresponding relation to the shape of the storage container 14 or other object 400 that will be supported by the apparatus 10. As described above with regard to the rectangular-shaped storage container 14, the linear shaped, perpendicularly disposed static support member 94 and dynamic support member 314 are configured in corresponding relation to the rectangular storage container 14. For other shapes of the storage container 14 and object 400, the static support member 94 and dynamic support member 314 can have different sizes and shapes to better be able to securely support the storage container 14 and object 400 in the apparatus 10. For instance, with regard to the prior art round or oval shaped storage container (as object 400*b*) shown in FIG. 51, having a single sidewall 490, the static support member 94 and dynamic support member 314 can have a curved shape, as shown in FIG. 52, to better engage such a storage container 14 (or other object 400). In such an embodiment, the static support member 94 and dynamic support member 314 are configured in, at least generally, corresponding relation to the sidewall 490 of the round or oval container 400*b*. As shown in FIG. 52, the static support member 94 and dynamic support member 314 have outwardly extending areas (shown respectively as 424 and 444) that extend the ends of the the static support member 94 and dynamic support member 314 outwardly from the sidewalls 256/258 of the support rail 252 so as to better support and secure the storage container 14 or object 400 in the apparatus 10. As with embodiments set forth above, the static support member 94 and dynamic support member 314 are mirror configurations of each other.

As set forth above, another one of the major benefits the apparatus 10 of the present invention is that the apparatus 10 is adaptable to being very easy, convenient and likely less expensive to store and ship. In a preferred configuration of the apparatus 10, the various components are connected together using screws, bolts and other devices that make it easy to assemble and disassemble the apparatus 10. In addition, the components of the static container support assembly 248 and the dynamic container support assembly 90 are sized and configured such that when the apparatus 10 is disassembled, all of these components will fit inside the interior channel of the support rail 252. In effect, therefore, when the apparatus is in its disassembled condition it will be no larger, or not much larger, than the size of the support rail 252. As will be readily appreciated by persons skilled in the relevant art, this will make it much easier and likely less expensive for the manufacturer, distributor or others to ship the apparatus 10 to a retail location, distribution center and/or an end user. In addition, the much smaller disassembled apparatus 10 will be much easier for the manufacturer, distributor, retailer and user to store (taking less space) and handle when the apparatus 10 is not in use.

As will be readily appreciated by persons skilled in the relevant art, the various components of the static container support assembly 248 and dynamic container support assembly 90 set forth above can be modified in a wide variety of different manners and still accomplish the objects of the apparatus 10 and system 12 of the present invention. For instance, although the ability of the components to easily disconnect from each other has certain advantages with regard to storing and shipping the apparatus 10 of the present invention (as set forth above), these components may be fixedly connected, such as by welding or the like, or integrally formed and still accomplish the desired objectives.

To store storage containers 14 in the apparatus 10, the user places the bottom of one of the container lips, such as second lip 44, alongside the length of the lip engaging device 102 or lip engaging member 316 of the dynamic support 100 and applies pressure, via the container 14, to push the dynamic support 100 rearward to increase the area in the container space 92 to open a gap larger than the width W of the container 14. Pushing the dynamic support member 314 rearward moves the moving mechanism 142 associated and the dynamic support 100 rearward along track 214 associated with the support rail 252 (e.g., along the upturned sections 272a/272b inside the interior channel 260 of the support rail 252). Once the container 14 is positioned in the container space 92, the person allows the biasing mechanism 108 to push or pull the lip engaging device 102 or dynamic support member 314 and the container 14 toward the static container support member 88 or static container support assembly 248 until the lip engaging member 98 thereof engages the container 14 just below the first lip 44 thereof, thereby placing the apparatus 10 in its second/container storage position 264. At that point, the width of the container space 92 will be slightly larger (very little) than the width W of the storage container 14, but smaller than the width at the lips 44/46, allowing the lip engaging member 98 of the static container support member 88 and the lip engaging device 102 or lip engaging member 316 of the dynamic container support assembly 90 to support the container 14 by its lips 44/46 in the container space 92 to removably store the storage container 14 in the apparatus 10. The bottom surface of the container lips 44/46 will be resting on the upper surface of the lip engaging member 98 and the lip engaging device 102 or lip engaging member 316, with the remaining portion of the container body 15, which will be most of the container 14, hanging below the apparatus 10. As shown in FIG. 24, the bottom wall 36 of the container 14 will be in spaced apart relation to the floor, ground or other lower surface 250. To remove a container 14, the person merely pushes the storage container 14 against the lip engaging device 102 or dynamic support member 314 of the dynamic support 100 to overcome the biasing force of the biasing mechanism 108 and increase the width of the container space 92. The person then takes the container lips 44/46 off of the lip engaging member 98 and the lip engaging device 102 or lip engaging member 316 to remove the container 14 from the apparatus 10. The biasing force of the biasing mechanism 108 will push or pull the components of the dynamic support 100 back into the container space 92, placing the apparatus 10 in its first/biased position 262.

The apparatus 10 and system 12 of the present invention make it easier and more efficient to organize containers 14 in a garage, shed, room, closet, storage area, warehouse or other area where such containers 14 will be stored, particularly for items stored therein that are only occasionally utilized. Specifically, the apparatus 10 and system 12 of the present invention allow a person to better organize the storage of containers 14 by utilizing previously unutilized/underutilized or inconveniently or inefficiently used space below the ceiling 56 or roof above a lower surface 250 in the area. The new apparatus 10 and system 12 allow the person to easily, quickly and efficiently place, store and retrieve storage containers 14. As set forth above, the apparatus 10 is configured to allow a person to retrieve a storage container 14 from any place in the container space 92 between the dynamic support 100 of the dynamic container support assembly 90 and the static container support assembly 248 without having to move other storage containers 14 out of the way. Unlike prior art storage container organizers, particularly the prior art I-beam type, the apparatus 10 of the present invention does not require an open end to slide the containers 14 onto the spaced apart flanges of the apparatus 10. Instead, a storage container 14 can be placed into the apparatus 10 at any location where there is an empty spot in the container space 92. Because there is no need to measure the containers 14 and it is not necessary to carefully position the opposing I-beams, for the prior art system, the apparatus 10 and system 12 are much easier to install and use than prior art apparatuses and systems for storing storage containers 14.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A storage apparatus for storing an object below one or more area supports, the object having one or more sidewalls, said apparatus comprising:
    a mounting section comprising an elongated support rail structured and arranged to attach said apparatus to at least one of the one or more area supports, said support rail having an upper wall defining an upper mounting surface configured to be attached to at least one of the one or more area supports so as to position said support rail below the area supports; and
    a container engaging section attached to or integral with said mounting section, said container engaging section structured and arranged to engage the object so as to position the object in a container space of said container engaging section, said container engaging section comprising a static container support assembly and a dynamic container support assembly, said static container support assembly attached to or integral with said support rail so as to be fixed relative to said support rail, said dynamic container storage assembly having a dynamic support moveably engaged with said support rail in spaced apart relation to said static support member so as to define said container space therebetween, said static container support assembly having a static support member structured and arranged to engage a sidewall of the one or more sidewalls of the object, said dynamic support having a dynamic support member disposed in spaced apart relation to said static support member and structured and arranged to engage a sidewall of the one or more sidewalls of the object, each of said static support member and said dynamic support member having outwardly extending areas thereof that extend outward from sidewalls of said support rail so as to securely support the object in said container space below said support rail.

2. The apparatus of claim 1, wherein said dynamic support comprises a biasing mechanism, said biasing mechanism interconnecting said dynamic support member and one of said support rail and said static container support assembly so as to bias said dynamic support member toward said static support member, said dynamic support member moveably supported on said support rail so as to be biased by said biasing mechanism toward said static support member to engage and support the object therebetween.

3. The apparatus of claim 2, wherein said object has a container body with a first lip and a second lip extending outward from the one or more sidewalls of the container body, said static container support assembly has a lip engaging member attached to or integral with said static support member and sized and configured to engagedly support the first lip of the container body and said dynamic support member has a lip engaging member sized and configured to engagedly support the second lip of the container body to securely hold the object between said lip engaging member of said static support member and said lip engaging member of said dynamic support member so as to removably support the object in said container space.

4. The apparatus of claim 1, wherein said sidewalls of said support rail extend at least generally between a first end of said support rail and a second end of said support rail to define an interior channel in said support rail and said dynamic support having a moving mechanism connected to said dynamic support member, said moving mechanism being sized and configured to move along said support rail so as to allow said dynamic support to move along said support rail.

5. The apparatus of claim 4, wherein said support rail has a track in said interior channel thereof, said moving mechanism being structured and arranged to engage said track while moving along said track of said support rail.

6. The apparatus of claim 5, wherein said moving mechanism is cooperatively sized and configured with said support rail so as to moveably engage said support rail and said track without tilting said dynamic support member.

7. The apparatus of claim 6, wherein said moving mechanism comprises one of a track engaging member and one or more track engaging devices rotatably mounted on a frame, with said track engaging member and said track engaging devices being sized and configured to at least substantially extend between said track and said upper wall of said support rail when moving said dynamic support along said support rail.

8. The apparatus of claim 6, wherein said moving mechanism is a track engaging member and said track is defined by a first inwardly extending member and a second inwardly extending member of said support rail, said track engaging member having a member body with a groove in each of a first side and a second side of said member body, said grooves on each of said first side and said second side of said member body being cooperatively configured with said first inwardly extending member and said second inwardly extending member so as to moveably engage said track in said grooves of said track engaging member.

9. The apparatus of claim 1, wherein said static support member and said dynamic support member are cooperatively configured so as to be mirror configurations of each other.

10. The apparatus of claim 1, wherein said static container support assembly further comprises a static bracket interconnecting said static support member and said support rail and said dynamic container support assembly further comprises a dynamic bracket interconnecting said dynamic support member and said support rail.

11. The apparatus of claim 10, wherein at least one of said static bracket and said dynamic bracket has a clip body having an upper end structured and arranged to be securely engage said support rail and a lower end structured and arranged to securely engage, respectively, said static support member or said dynamic support member.

12. The apparatus of claim 1, wherein said apparatus is defined as a first apparatus and said support rail of said first apparatus comprises a joining mechanism that is structured and arranged to connect said first apparatus in an end-to-end manner to a second apparatus having a support rail with a joining mechanism cooperatively configured with said support rail of said first apparatus.

13. A storage apparatus for storing an object below one or more area supports, the object having one or more sidewalls, said apparatus comprising:
    a mounting section comprising an elongated support rail structured and arranged to attach said apparatus to at least one of the one or more area supports, said support rail having an upper wall defining an upper mounting surface configured to be attached to at least one of the one or more area supports so as to position said support rail below the area supports, said support rail having a track associated therewith; and
    a container engaging section attached to or integral with said mounting section, said container engaging section structured and arranged to engage the object so as to position the object in a container space of said container engaging section, said container engaging section comprising a static container support assembly and a dynamic container support assembly, said static container support assembly attached to or integral with said support rail so as to be fixed relative to said support rail, said dynamic container storage assembly having a dynamic support moveably engaged with said support rail in spaced apart relation to said static support member so as to define said container space therebetween, said static container support assembly having a static support member structured and arranged to engage a sidewall of the one or more sidewalls of the object, said dynamic support comprising:
    a dynamic support member disposed in spaced apart relation to said static support member and structured and arranged to engage a sidewall of the one or more sidewalls of the object;
    a moving mechanism connected to said dynamic support member, said moving mechanism structured and arranged to engage said track while moving along said track of said support rail; and
    a biasing mechanism interconnecting said dynamic support member and one of said support rail and said static container support assembly so as to bias said dynamic support member toward said static support member,
    wherein each of said static support member and said dynamic support member have outwardly extending areas thereof that extend outward from opposite disposed sidewalls of said support rail so as to securely support the object in said container space below said support rail, said dynamic support member moveably supported on said support rail by said moving mechanism so as to be biased by said biasing mechanism toward said static support member to engage and support the object therebetween.

14. The apparatus of claim 13, wherein said sidewalls of said support rail extend at least generally between a first end of said support rail and a second end of said support rail to define an interior channel in said support rail, said moving mechanism being cooperatively sized and configured with said support rail so as to moveably engage said support rail and said track without tilting said dynamic support member.

15. The apparatus of claim 14, wherein said moving mechanism is a track engaging member and said track is defined by a first inwardly extending member and a second inwardly extending member of said support rail, said track engaging member having a member body with a groove in each of a first side and a second side of said member body, said grooves on each of said first side and said second side of said member body being cooperatively configured with said first inwardly extending member and said second inwardly extending member so as to moveably engage said track in said grooves of said track engaging member.

16. The apparatus of claim 13, wherein said static support member and said dynamic support member are cooperatively configured so as to be mirror configurations of each other.

17. The apparatus of claim 13, wherein said static container support assembly further comprises a static bracket interconnecting said static support member and said support rail and said dynamic container support assembly further comprises a dynamic bracket interconnecting said dynamic support member and said support rail.

18. The apparatus of claim 17, wherein at least one of said static bracket and said dynamic bracket has a clip body having an upper end structured and arranged to be securely engage said support rail and a lower end structured and arranged to securely engage, respectively, said static support member or said dynamic support member.

19. A container storage system, comprising:
one or more area supports;
an object having one or more sidewalls; and
a storage apparatus having a mounting section to mount said apparatus to said one or more area supports and a container engaging section attached to or integral with said mounting section to store said object below said one or more area supports, said mounting section comprising an elongated support rail structured and arranged to attach said apparatus to said one or more area supports, said support rail having an upper wall, one or more sidewalls and a track associated with said one or more sidewalls thereof, said upper wall configured to be attached to said one or more area supports so as to position said support rail below said area supports, said container engaging section structured and arranged to engage said container body so as to position said object in a container space of said container engaging section, said container engaging section having a static container support assembly and a dynamic container support assembly, said static container support assembly attached to or integral with said support rail so as to be fixed relative to said support rail, said dynamic container storage assembly having a dynamic support moveably engaged with said track of said support rail and disposed in spaced apart relation to said static support member so as to define said container space therebetween, said static container support assembly having a static support member structured and arranged to engage a sidewall of said one or more sidewalls of said object, said dynamic support having:

a dynamic support member disposed in spaced apart relation to said static support member and structured and arranged to engage a sidewall of said one or more sidewalls of said object;

a moving mechanism connected to said dynamic support member, said moving mechanism structured and arranged to engage said track while moving along said track of said support rail; and a biasing mechanism interconnecting said dynamic support member and one of said support rail and said static container support assembly so as to bias said dynamic support member toward said static support member, wherein each of said static support member and said dynamic support member have outwardly extending areas thereof that extend outward from opposite disposed sidewalls of said support rail so as to securely support said object in said container space below said support rail, said dynamic support member moveably supported on said support rail by said moving mechanism so as to be biased by said biasing mechanism toward said static support member to engage and support said object therebetween.

20. The system of claim 19, wherein said moving mechanism is a track engaging member and said track is defined by a first inwardly extending member and a second inwardly extending member of said support rail, said track engaging member having a member body with a groove in each of a first side and a second side of said member body, said grooves on each of said first side and said second side of said member body being cooperatively configured with said first inwardly extending member and said second inwardly extending member so as to moveably engage said track in said grooves of said track engaging member.

* * * * *